US009501592B1

(12) United States Patent
Kolpekwar et al.

(10) Patent No.: US 9,501,592 B1
(45) Date of Patent: Nov. 22, 2016

(54) METHODS, SYSTEMS, AND ARTICLES OF MANUFACTURE FOR IMPLEMENTING ANALOG BEHAVIORAL MODELING AND IP INTEGRATION USING SYSTEMVERILOG HARDWARE DESCRIPTION LANGUAGE

(71) Applicant: Cadence Design Systems, Inc., San Jose, CA (US)

(72) Inventors: Abhijeet S. Kolpekwar, Round Rock, TX (US); Aaron M. Spratt, Milford, MA (US); William S. Cranston, Haverhill, MA (US); Chandrashekar L. Chetput, San Jose, CA (US)

(73) Assignee: Cadence Design Systems, Inc., San Jose, CA (US)

(*) Notice: Subject to any disclaimer, the term of this patent is extended or adjusted under 35 U.S.C. 154(b) by 0 days.

(21) Appl. No.: 13/831,943

(22) Filed: Mar. 15, 2013

(51) Int. Cl.
*G06F 17/50* (2006.01)
(52) U.S. Cl.
CPC ................. *G06F 17/5036* (2013.01)
(58) Field of Classification Search
CPC .................................................. G06F 17/5036
USPC ............................................ 703/2, 4, 14, 17
See application file for complete search history.

(56) References Cited

U.S. PATENT DOCUMENTS

| | | | |
|---|---|---|---|
| 4,484,329 A | 11/1984 | Slamka et al. | |
| 6,748,456 B1 | 6/2004 | Stanton et al. | |
| 7,599,821 B1 | 10/2009 | Hou et al. | |
| 7,865,344 B2 | 1/2011 | Wozniak | |
| 7,885,682 B2 | 2/2011 | Sorrells et al. | |
| 8,255,191 B1 | 8/2012 | Kolpekwar et al. | |
| 8,296,699 B1 | 10/2012 | Chetput et al. | |
| 8,315,336 B2 | 11/2012 | Sorrells et al. | |
| 8,327,303 B1 | 12/2012 | Foster et al. | |
| 8,334,722 B2 | 12/2012 | Sorrells et al. | |
| 8,423,934 B1 | 4/2013 | Foster et al. | |
| 2011/0153305 A1 | 6/2011 | Chang et al. | |

OTHER PUBLICATIONS

Hartong, et al., "Real Valued Modeling for Mixed Signal Simulation", Product Version IES 8.2, Jan. 2009.*
R. Goering, "Webinar: Is SystemVerilog the Future of Mixed-Signal Modeling?", Oct. 2012, retrieved from http://www.cadence.com/Commununity/blogs/ii/archive/2012/10/04/webinar-is-systemverilog-the-future-of-mixed-signal-modeling.aspx on Aug. 11, 2014.*

(Continued)

*Primary Examiner* — Vuthe Siek
*Assistant Examiner* — Aric Lin
(74) *Attorney, Agent, or Firm* — Vista IP Law Group, LLP

(57) ABSTRACT

Some embodiments provide support for real number modeling in SystemVerilog by defining built-in nettypes with real data type and resolution functions natively in SystemVerilog and allow a simple path for porting Verilog-AMS wreal modeling to SystemVerilog modeling. Some embodiments provide support for incompatible nettypes and for net coercion in SystemVerilog. Some embodiments provide support for SystemVerilog reals net connecting to electrical nets and support for SystemVerilog real signals connecting to Verilog-AMS wreal signals. Some embodiments combine the strengths of Verilog-AMS and SystemVerilog languages to build a solution for value conversion between incompatible nets and an effective way to configure, simulate, or verify mixed-signal designs that are written in SystemVerilog language.

29 Claims, 20 Drawing Sheets

(56) References Cited

OTHER PUBLICATIONS

C. Cummings, "SystemVerilog Implicit Port Connections—Simulation & Synthesis", DesignCon 2005, Apr. 2005.*
Verilog-AMS Language Reference Manual, Version 2.0, Feb. 2000.*
"SV-DC User-defined nets and resolution functions", Feb. 2011, URL: http://www.eda.org/mantis/view.php?id=3398.
"SystemVerilog 3.1: Accellera's Extensions to Verilog®", 2002.
"SystemVerilog 3.1a Language Reference Manual: Accellera's Extensions to Verilog®", May 13, 2004.
"Verilog-AMS Language Reference Manual: Analog & Mixed-Signal Extensions to Verilog HDL", Jun. 1, 2009.
Non-Final Office Action dated Apr. 28, 2014 for U.S. Appl. No. 13/831,952.
Notice of Allowance dated Sep. 15, 2014 for U.S. Appl. No. 13/831,952.
Notice of Allowance dated Dec. 30, 2013 for U.S. Appl. No. 13/831,958.
Notice of Allowance dated Sep. 5, 2013 for U.S. Appl. No. 13/831,958.
Sutherland, S., et al., "DVCon 2012: Keeping Up with Chip—The ProposedSystemVerilog 2012 Standard Makes Verifying Ever-increasing Design Complexity More Efficient" Feb. 2012.

* cited by examiner

```
module buf1 (in, en, out);
    input in, en;
    output out;
    wreal in, out;
    real outval;
    always @(in,en) begin
        if (!en) outval=`wrealZState;
        else if (in === `wrealXState) outval=0;
        else outval=in;
    end
    assign out=outval;
endmodule;
```

FIG. 3

210, 214, 506, 604 Correlate Built-In Wreal Resolution Functions with Nettypes

| Built-In Resolution Function Keyword | Equivalent Wreal Type |
|---|---|
| CDS_res_wreal1driver | wreal1driver |
| CDS_res_wreal4state | wreal14state |
| CDS_res_wrealmax | wreal1max |
| CDS_res_wrealmin | wreal1min |
| CDS_res_wrealsum | wreal1sum |
| CDS_res_wrealavg | wreal1avg |

FIG. 6B

METHODS, SYSTEMS, AND ARTICLES OF MANUFACTURE FOR IMPLEMENTING ANALOG BEHAVIORAL MODELING AND IP INTEGRATION USING SYSTEMVERILOG HARDWARE DESCRIPTION LANGUAGE

CROSS REFERENCE TO RELATED APPLICATIONS

This application is related to U.S. patent application Ser. No. 13/831,952, entitled "METHODS, SYSTEMS, AND ARTICLES OF MANUFACTURE FOR IMPLEMENTING ANALOG BEHAVIORAL MODELING AND IP INTEGRATION USING SYSTEMVERILOG HARDWARE DESCRIPTION LANGUAGE" and U.S. patent application Ser. No. 13/831,958, entitled "METHODS, SYSTEMS, AND ARTICLES OF MANUFACTURE FOR IMPLEMENTING ANALOG BEHAVIORAL MODELING AND IP INTEGRATION USING SYSTEMVERILOG HARDWARE DESCRIPTION LANGUAGE" the content of both applications is hereby incorporated by reference in its entirety for all purposes.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Integrated circuits, or ICs, are created by patterning a substrate and materials deposited on the substrate. The substrate is typically a semiconductor wafer. The patterned features make up devices and interconnections. This process generally starts with a designer creating an integrated circuit by hierarchically defining functional components of the circuit using a hardware description language. From this high-level functional description, a physical circuit implementation dataset is created, which is usually in the form of a netlist. This netlist identifies logic cell instances from a cell library, and describes cell-to-cell connectivity.

Many phases of these electronic design activities may be performed with computer aided design (CAD) tools or electronic design automation (EDA) systems. For example, an integrated circuit designer may use a set of layout EDA application programs, such as a layout editor, to create a physical integrated circuit design layout from a logical circuit design. The layout EDA application uses geometric shapes of different materials to create the various electrical components on an integrated circuit and to represent electronic and circuit IC components as geometric objects with varying shapes and sizes. After an integrated circuit designer has created an initial integrated circuit layout, the integrated circuit designer then verifies and optimizes the integrated circuit layout using a set of EDA testing and analysis tools. Verification may include, for example, design rule checking to verify compliance with rules established for various IC parameters. The EDA layout editing tools are often performed interactively so that the designer can review and provide careful control over the details of the electronic design.

SystemVerilog (IEEE 1800 standard) is rapidly getting popular amongst design and verification community as a language of choice for describing the digital circuits. Recently, SystemVerilog is also extended to account for modeling for analog/mixed-signal circuits. These extensions allow users to model analog/mixed-signal behavior more accurately and support their evaluation by discrete event driven simulators. Specifically, these extensions allow creation and use of a SystemVerilog real signal that can support bi-directional communication. While such SystemVerilog real signal representations can be used to effectively model of analog mixed-signal behavior, these representations fall short in addressing issues in real life design applications.

The growing amount of analog circuitry on today's SoCs (System on Chip) further cements the growing understanding that isolated analog and digital verification may no longer be sufficient to reach tapeout. What is often needed is a chip-level functional verification that examines the functional interactions between analog and digital blocks. The challenges lie in how to implement such tasks, especially given that a SPICE/RTL (register-transfer level) co-simulation may be too slow. Verilog, for instance, has very limited real number modeling (RNM) support in that engineers may use real variables inside a model, but there are no real variable ports. VHDL (VHSIC Hardware Description Language or Very High Speed Integrated Circuit Hardware Description Language), on the other hand, supports real number ports, has custom or compound signals and ports that make it possible to pass both current and voltage, and offers custom resolution functions. The issue is that Verilog is nonetheless far more widely used for digital design than VHDL. Verilog-AMS (VAMS) is widely used for RNM. VAMS supports real number ports and variables, along with six resolution functions on wreal nets. VAMS also has an analog solver if higher accuracy is desired, along with a discrete solver that may be used for real value equations. SystemVerilog, meanwhile, is making strong inroads into digital design and verification. Far more than just another version of Verilog, SystemVerilog also includes extensive verification features and an assertion language. But the 2009 Language Reference Manual (LRM) does very little for analog modeling. For example, SystemVerilog provides a real variable that may be used as a port. Nonetheless, by its definition as variable, the port cannot be bi-directional, cannot have multiple drivers, and so forth. Real number modeling provides a fast way to run a chip-level simulation with analog values, but the support for RNM in the current SystemVerilog Language Reference Manual (2009 LRM) is unfortunately very limited.

Thus, there exists a need for a method, a system, and an article of manufacture for implementing analog behavioral modeling and IP (intellectual property) integration using SystemVerilog Hardware Description Language.

SUMMARY

Disclosed are method(s), system(s), and article(s) of manufacture for implementing analog behavioral modeling and IP (intellectual property) integration using SystemVerilog Hardware Description Language (HDL) in one or more embodiments.

In some embodiments, a computer system executing various modules described herein may execute the method to provide support for real number modeling in SystemVerilog at least by creating, defining, or declaring a set of built-in nettypes with real data type and built-in resolution functions natively in SystemVerilog using the SystemVerilog-DC nettype framework. Some of the embodiments also allow a simple path for migrating from or porting (hereinafter porting) Verilog-AMS wreal modeling to SystemVerilog modeling. Some embodiments support real number modeling in SystemVerilog while accommodating VHDL modeling that includes the real data type by using, for example, real number port(s), custom or compound signal(s) or port(s), etc. that are supported in VHDL. In some embodiments, a computer system executing various modules described herein may execute the method to provide the support for incompatible nettypes in SystemVerilog, and the support for advanced net coercion to enable easy plug and play of SystemVerilog blocks. In some embodiments, the computer system executing various modules described herein may execute the method to provide support for SystemVerilog reals net connecting to electrical nets and support for SystemVerilog real signals connecting to, for example but not limited to, Verilog-AMS wreal signals, VHDL real signals, or any other real-valued signals.

In some embodiments, the computer system executing various modules described herein may execute the method to provide support for extended compatibility semantics for SystemVerilog nettypes and support for table models with SystemVerilog real signals.

Various embodiments extend SystemVerilog semantics well beyond the language standards to enable more effective use of mixed-signal languages. For example, current SystemVerilog standard does not allow connection of incompatible nettypes. When a SystemVerilog "wire" is connected to a SystemVerilog Real, the real value is implicitly converted to match the "wire" (4-state logic) datatype. In a mixed-signal world, this may lead to undesired outcomes. Some embodiments described herein extend the current SystemVerilog semantics by providing capabilities to "coerce" a SystemVerilog "wire" to be type compatible to the nets, to which the wire is connected.

Some embodiments combine the strengths of Verilog-AMS and SystemVerilog languages to build a solution that allows to effect value conversion between incompatible nets. For example, if there exist two nets with different nettypes connected to each other, some embodiments allow a user or the computer system to specify (in the Verilog-AMS style) or identify connect rules to select and insert Verilog-AMS connect modules between the 2 SystemVerilog nets. The combination of SystemVerilog nets and Verilog-AMS connect modules provides an effective way to configure, simulate, or verify mixed-signal designs that are written in SystemVerilog language.

Some embodiments are directed at a hardware system that may be invoked to perform any of the methods, processes, or sub-processes disclosed herein. The hardware system may include at least one processor or at least one processor core, which executes one or more threads of execution to perform any of the methods, processes, or sub-processes disclosed herein in some embodiments. The hardware system may further include one or more forms of non-transitory machine-readable storage media or devices to temporarily or persistently store various types of data or information. Some exemplary modules or components of the hardware system may be found in the System Architecture Overview section below.

Some embodiments are directed at an article of manufacture that includes a non-transitory machine-accessible storage medium having stored thereupon a sequence of instructions which, when executed by at least one processor or at least one processor core, causes the at least one processor or the at least one processor core to perform any of the methods, processes, or sub-processes disclosed herein. Some exemplary forms of the non-transitory machine-readable storage media may also be found in the System Architecture Overview section below.

BRIEF DESCRIPTION OF THE DRAWINGS

The drawings illustrate the design and utility of various embodiments of the invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which:

FIG. 3 illustrates an exemplary analog event expression for an analog buffer with enable in some embodiments.

FIGS. 5A-1 and 5A-2 illustrate two high level flow diagrams for implementing analog behavioral modeling and IP (intellectual property) integration using SystemVerilog Hardware Description Language in some embodiments.

FIGS. 5E-1 and 5E-2 illustrate two high level flow diagrams for implementing analog behavioral modeling and IP (intellectual property) integration using SystemVerilog Hardware Description Language in some embodiments.

FIG. 6B illustrates a more detailed diagram for a part of the flow diagram illustrated in FIG. 6 in some embodiments.

DETAILED DESCRIPTION

Various embodiments are directed to methods, systems, and articles of manufacture for implementing analog behavioral modeling and IP (intellectual property) integration using SystemVerilog Hardware Description Language. Other objects, features, and advantages of the invention are described in the detailed description, figures, and claims.

Various embodiments will now be described in detail with reference to the drawings, which are provided as illustrative examples of the invention so as to enable those skilled in the art to practice the invention. Notably, the figures and the examples below are not meant to limit the scope of the present invention. Where certain elements of the present invention may be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, various embodiments encompass present and future known equivalents to the components referred to herein by way of illustration.

Disclosed are method(s), system(s), and article(s) of manufacture for implementing analog behavioral modeling and IP (intellectual property) integration using SystemVerilog Hardware Description Language in one or more embodiments. Some embodiments described herein are directed at the upcoming 1800-2009 IEEE Standard for SystemVerilog Unified Hardware Design, Specification, and Verification Language as extensions to the current IEEE 1800-2009 standard. As a result of such extensions to the current IEEE 1800-2009 standard, the current IEEE 1800-2009 standard, the Accellera's Extensions to Verilog to IEEE 1364-2005 standard, and the Verilog-AMS Language Reference Manual for the Analog & Mixed-Signal Extensions to Verilog HDL are hereby expressly incorporated by reference in their entireties for all purposes.

Figure 1:
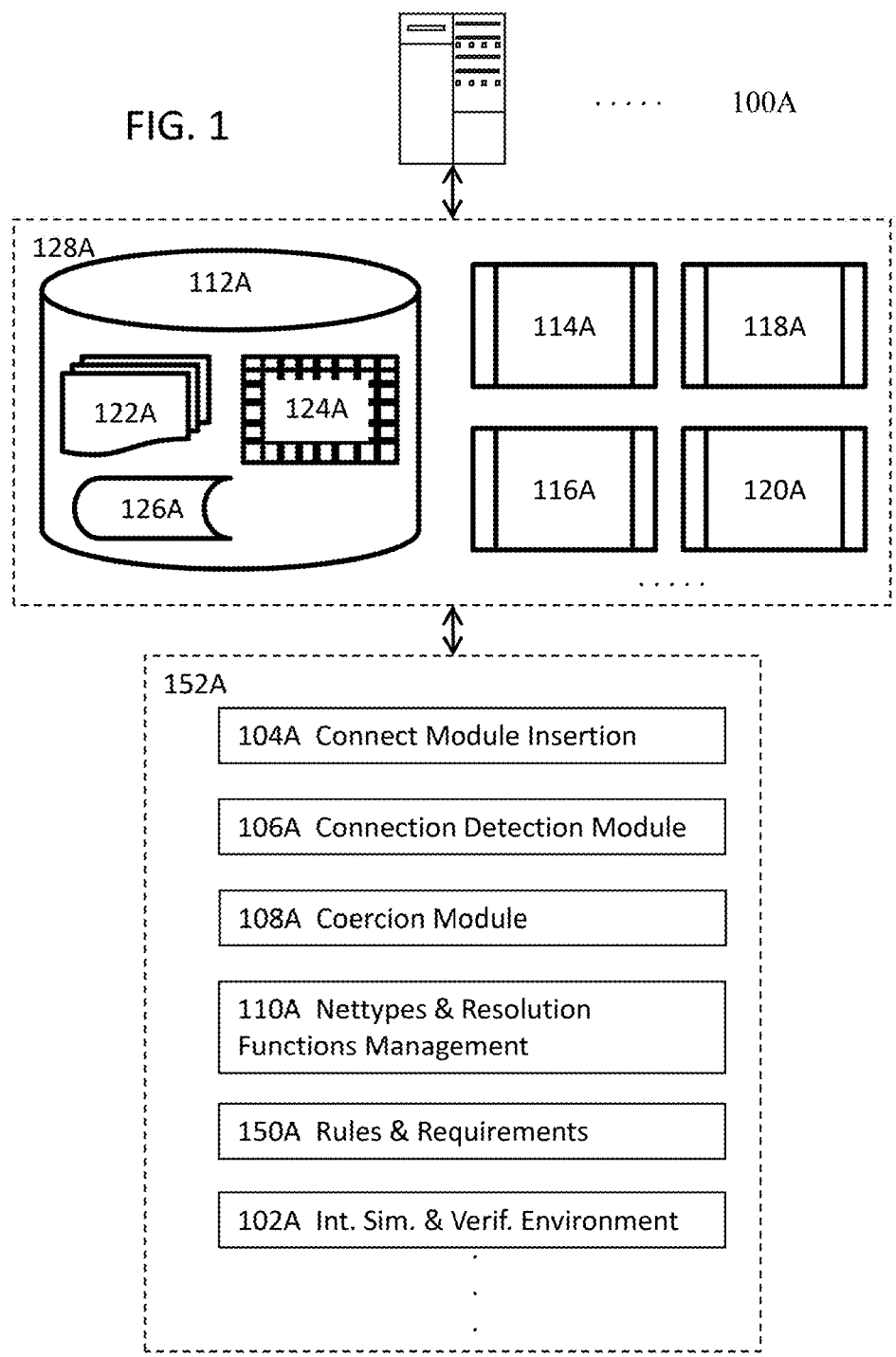
FIG. 1 illustrates a high level block diagram for a system for implementing analog behavioral modeling and IP (intellectual property) integration using SystemVerilog Hardware Description Language in some embodiments.

FIG. 1 illustrates a high level block diagram for a system for implementing analog behavioral modeling and IP integration using SystemVerilog Hardware Description Language in some embodiments. In one or more embodiments, the system for implementing analog behavioral modeling and IP integration using SystemVerilog Hardware Description Language may comprise one or more computing systems 100A, such as a general purpose computer described in the System Architecture Overview section to implement one or more special proposes.

In some embodiments, the one or more computing systems 100A may invoke various system resources such as the processor(s) or processor core(s), memory, disks, etc. The one or more computing systems 100A may also initiate or interact with other computing systems to access various resources 128A that may comprise a global routing engine and/or a detail routing engine 114A, a layout editor 116A, a design rule checker 118A, a verification engine 120A, etc. The one or more computing systems 100A may further write to and read from a local or remote volatile or non-volatile computer accessible storage 112A that stores thereupon data or information such as, but not limited to, one or more data structures or databases (124A) (collectively database or databases hereinafter) such as various design databases including schematic design database(s) and physical design database(s). The local or remote volatile or non-volatile computer accessible storage 112A may further store thereupon libraries such as design rule decks, constraints, etc. (122A), or other information or data (126A) that may be used to facilitate the performance of various functions to achieve the intended purposes.

In some embodiments, the one or more computing systems 100A may, either directly or indirectly through various resources 128A to invoke various software, hardware modules or combinations thereof 152A that may comprises a connect module selection and insertion module 104A to select and insert one or more connect modules into electronic designs, a connection detection module 106A to detect incompatible connections (e.g., analog or electrical to digital or logic) in electronic designs, one or more database modules 108A to store, modify, extract, manage, or manipulate information or data from and to databases, a nettype and resolution function management module 110A to create, modify, or manage nettypes and resolution functions, a rules and requirement module 150A to store, modify, or manage various rules or requirements such as connection rules, etc., and an integrated simulation or verification environment 102A to perform various simulations or verification for electronic designs The integrated simulation or verification environment 102A may first compile the sources with appropriate compilers during the first time execution of the environment 102A, and subsequent executions require no elaboration and may run the simulations directly.

The integrated simulation or verification environment 102A may then elaborate the electronic design of interest. During the first time execution, the integrated simulation or verification environment 102A may build a temporary or persistent directory to store the intermediate objects and files needed to run the simulations or verification, and subsequent executions requires no elaboration of the same electronic design and run the simulations or verification directly with the intermediate objects and files in the temporary or persistent directory. The module 102A may further determine whether there is a change that requires re-compilation and re-elaboration based on these intermediate objects and files and iii. run the simulations or verification by utilizing various, integrated simulation tools or verification tools that recognize various source files of various formats, such as VHDL, e-language, SystemVerilog source files, etc. The module 102A may then store its simulation or verification output in a single file (e.g., "sim.log" or "verification.log"), in multiple files, or in one or more data structures such as one or more databases. One of the advantages of the integrated simulation or verification environment 102A is that the module 102A may simulate and/or verify the multi-language design and verification environments in a single step by simply specifying all input source files and options on a single command line or interactive input field in a user interface in some embodiments. Another advantage of the integrated simulation or verification environment 102A is that it supports all simulation languages, such as Verilog, VHDL, SystemVerilog, Verilog-AMS, VHDL AMS, and even files written in general programming languages such as C, C++, Java, etc.

Figure 2:
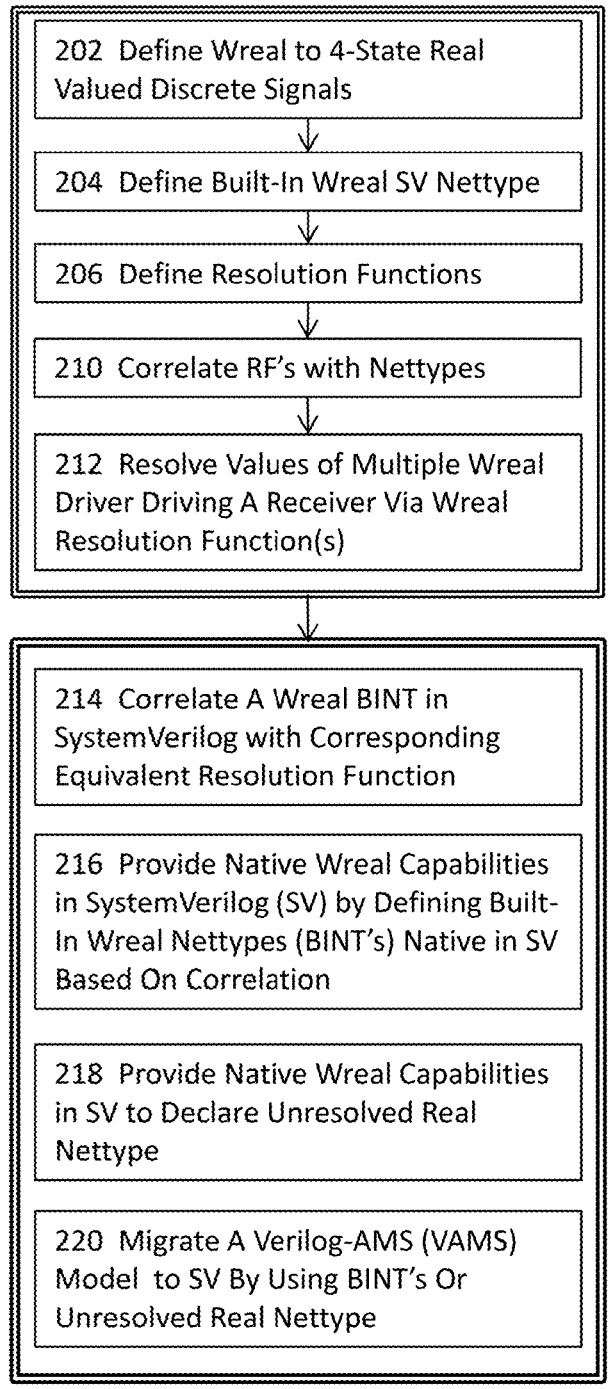
FIG. 2 illustrates a top level flow diagram for implementing analog behavioral modeling and IP (intellectual property) integration using SystemVerilog Hardware Description Language in some embodiments.

FIG. 2 illustrates a top level flow diagram for implementing analog behavioral modeling and IP integration using SystemVerilog Hardware Description Language in some embodiments. In one or more embodiments, the method for implementing analog behavioral modeling and IP integration using SystemVerilog Hardware Description Language comprises the process 202 of defining wreal signals to 4-state real valued discrete signals including "0.0", "non-zero", "wrealXstate" (unknown state), and wrealZstate (high-impedance state). For example, some embodiments may, in addition to the "0.0" and "non-zero", define wrealZState as the high-impedance state and 'wrealXState as the unknown state. Various embodiments predefine these four states that may be accessed in the behavioral source code. In various embodiments, a wreal defined for SystemVerilog is identical to or substantially similar to a Verilog-AMS wire type from the discipline resolution perspective with a real value type. The wreal may have a discipline associated with it, and the association of a resolution function with wreal may be achieved via the default setting (e.g., 'default-discipline wreal ddiscrete), via discipline declaration (e.g., wreal w; ddiscrete w;), or, as in Verilog-AMS, via discipline resolution process based at least in part upon the connectivity or usage of the wreal. In various embodiments, wreals are defined to be discrete signals having four states accessible in the behavioral source code, instead of the two states of the wreals in Verilog-AMS.

In the current standard, Verilog-AMS HDL supports integer, genvar, real, and parameter data types as found in IEEE standard 1364-2005 Verilog HDL. It includes the string data type defined by IEEE standard 1800-2005 SystemVerilog. It also modifies the parameter data types and introduces array of real as an extension of the real data type. Plus, it extends the net data types to support a new type called wreal to model real value nets. The wreal, or real net data type, represents a real-valued physical connection between structural entities. A wreal net shall not store its value. A wreal net can be used for real-valued nets which are driven by a single driver, such as a continuous assignment. If no driver is connected to a wreal net, its value shall be zero (0.0). Unlike other digital nets which have an initial value of "Z", wreal nets shall have an initial value of zero in the current IEEE standards. Moreover, wreal nets can only be connected to compatible interconnect and other wreal or real expressions according to the current IEEE standards. In other words, wreal nets cannot be connected to any other wires, although connection to explicitly declared 64-bit wires can be done via system tasks $realtobits and $bitstoreal.

Compatible interconnect are nets of type wire, tri, wreal, and variants thereof such as wand, triand, etc. where the IEEE standard 1364-2005 Verilog HDL net resolution is extended for wreal. When the two nets connected by a port are of net type wreal and wire/tri, the resulting single net will be assigned as wreal. Connection to incompatible net types may result in an error in some embodiments. In addition, current Verilog-AMS HDL supports ports which are declared to be real-valued and have a discrete-time discipline. This is done using the net type wreal. Nonetheless, the "wreal" in the current Verilog-AMS only supports two states—the "low" and "high" states, and there can be a maximum of one driver of a real-valued net in the current IEEE standards such that the initial value of a real-valued net may have an initial value of "z", rather than zero as in the current Verilog-AMS standards. Some embodiments extend the two-state wreal to discrete 4-state signals and incorporate the 4-state wreal in the SystemVerilog. Some other embodiments further improve the current standards to work with real-valued nets that are driven by multiple drivers and resolve the values of such multiple drivers appropriately. Some other embodiments further enable real-valued nets (e.g., wreal nets) to be connected to compatible and incompatible nets or interconnects or other wreal or real expressions, instead of being connected only to compatible interconnects or nets as in the current IEEE standards.

In some embodiments, a signal may be digital, analog, or mixed, and may be a hierarchical collection of nets which are contiguous (e.g., due to port connections). For analog and mixed signals, a single node is associated with all continuous net segments of the signal. A fundamental characteristic of analog and mixed signals is the values of the associated node may be determined by the simultaneous solution of equations defined by the instances connected to the node using Kirchhoff's conservation laws. In general, a node represents a point of physical connections between nets of continuous-time description and it obeys conservation-law semantics. A net may be characterized by the discipline it follows. For example, all low-voltage nets may have certain common characteristics, all mechanical nets may have certain common characteristics, etc. Therefore, a net may be declared as a type of discipline. In these embodiments, a discipline is a user-defined type for declaring a net. A discipline may be characterized by the domain and the attributes defined in the natures for potential and flow. In some embodiments, the wreal, or real net data type, represents a real-valued physical connection between structural entities.

A wreal net may not store its value in some embodiments. In some current approaches, a wreal net may be used for real-valued nets which are driven by a single driver, such as a continuous assignment. If no driver is connected to a wreal net, its value shall be zero (0.0) in these current approaches. Unlike other digital nets which have an initial value of 'z', wreal nets shall have an initial value of zero. Various embodiments remove this single driver limitation and provide the capabilities of resolving multiple wreal drivers driving a receiver, and wreal nets may have an initial value of 'z' with various embodiments. In addition, in the current approaches, wreal nets can only be connected to compatible interconnect and other wreal or real expressions. That is, the wreal nets cannot be connected to any other wires, although connection to explicitly declared 64-bit wires can be done via system tasks $realtobits and $bitstoreal. Compatible interconnect are nets of type wire, tri, wreal, and variants thereof such as wand, triand, etc. where the IEEE standard 1364-2005 Verilog HDL net resolution is extended for wreal. When the two nets connected by a port are of net type wreal and wire/tri, the resulting single net will be assigned as wreal. Connection to incompatible net types may result in an error in some embodiments. Some embodiments enable users to connect wreal nets to incompatible interconnects by, for example, using the coercion techniques described herein or the connect module techniques.

In some embodiments, a discipline description includes specifying a domain type and binding any natures to potential or flow. A discipline may be defined between the keywords discipline and enddiscipline. Moreover, each discipline may have a unique identifier as the name of the discipline. The discipline declarations are at the same level as nature and module declarations in the source text. In these embodiments, disciplines may be declared at the top level and discipline declarations do not nest inside other discipline declarations, nature declarations, or module declarations. Analog behavioral nets (e.g., nodes) may have a discipline defined for them, but interconnect and digital nets may not. It is possible to set the discipline of interconnect and digital nets through discipline declaration with hierarchical references to these nets in some embodiments. It may be an error to hierarchically override the discipline of a net that was explicitly declared unless it is a compatible discipline.

Some embodiments also introduce "domain" and "disciplines", both of which used to regarded as Verilog-AMS specific elements, as native capabilities of SystemVerilog. These embodiments enable users to directly model analog or mixed-signal designs directly in SystemVerilog or migrating or porting existing Verilog-AMS designs into SystemVerilog to leverage the extensive functionalities of SystemVerilog (e.g., digital verification techniques or assertions, etc.) while enjoying identical or substantially similar capabilities that Verilog-AMS provides in real number modeling without having to rewrite functional details of these existing analog or mixed-signal designs such as but not limited to existing Verilog-AMS designs. In other words, one of the advantages of various embodiments described herein is that users no longer need to avoid Verilog-AMS specific elements in using the SystemVerilog modeling environment when users attempt to migrate or port an existing Verilog-AMS model into SystemVerilog. Real number modeling (RNM) is a signal-flow based approach that uses real (floating-point, continuous) values to represent current or voltage in discrete time. It runs in a digital simulation environment and removes the need to use a much slower analog solver. In addition to allowing digital simulation speeds, RNM lets designers use digital verification techniques such as assertions, coverage, and metric-driven verification.

In some embodiments, the method for implementing analog behavioral modeling and IP integration using SystemVerilog Hardware Description Language comprises the process 204 of defining or declaring one or more built-in wreal SystemVerilog nettypes (hereinafter "BINT".) For example, the method may declare a built-in real SystemVerilog nettype by using the syntax as shown below:

nettype real nettype_identifier with builtin_res_func;

Where the nettype_identifier is the identifier that may be used for the nettype, and builtin_res_func is a built-in resolution function, which will be described in greater details below. In the above exemplary syntax, the datatype is a singular "real" that may comprise either the built-in real type or a typedef to the built-in real type.

Some embodiments may also declare an unresolved real nettype by using an exemplary syntax as shown below:

nettype real myNetType;

In the above example, the datatype is also a singular real, and the "nettype_identifier" is "myNetType". In some embodiments, an unresolved nettype may only have a single driver, and having multiple drivers may result in an elaboration error. In some other embodiments, some embodiments provide multiple wreal drivers resolution and thus may provide a warning, instead of an error, in situations where more than one active driver is present at simulation time.

Some embodiments also provide the capability of renaming built-in nettypes. For example, the method may rename built-in nettypes by using an exemplary syntax as shown below:

nettype real wrealavg with CDS_res_wrealavg;
nettype wrealavg myWrealAvg;

In the above example, the method declares a built-in nettype "wrealavg" and renames "wrealavg" to "myWrealAvg". After the renaming, the method may use "wrealavg" and "myWrealAvg" interchangeably with identical effects.

Once the built-in nettypes have been declared, the method may use the declared built-in nettypes in exactly the same manner as that for other nets of user defined nettype as governed by the SystemVerilog Language Reference Manual. The method may create a net of built-in nettype by using an exemplary syntax as shown below:

nettype real wrealavg with CDS_res_wrealavg;
wrealavg x;
wrealavg x [0:3];

In the above example, "nettype real wrealavg with CDS_res_wrealavg;" declares a built-in nettype "wrealavg". "wrealavg x;" declares a singular net of nettype "wrealavg". "wrealavg x [0:3];" declares a four element array of nets of nettype "wrealavg".

In some embodiments, the method for implementing analog behavioral modeling and IP integration using SystemVerilog Hardware Description Language comprises the process 206 of defining one or more resolution functions. Unlike some current approaches that avoid any Verilog-AMS specific elements (e.g., "domain" and "disciplines"), these embodiments actually define and incorporate various disciplines and resolution functions into SystemVerilog to provide the capabilities of having connections of incompatible types and resolving multiple wreal drivers instead of requiring a single driver. These embodiments provide a resolution of the wreal driver values using wreal resolution functions in situations where two or more wreal drivers are driving a receiver.

Figure 2A:
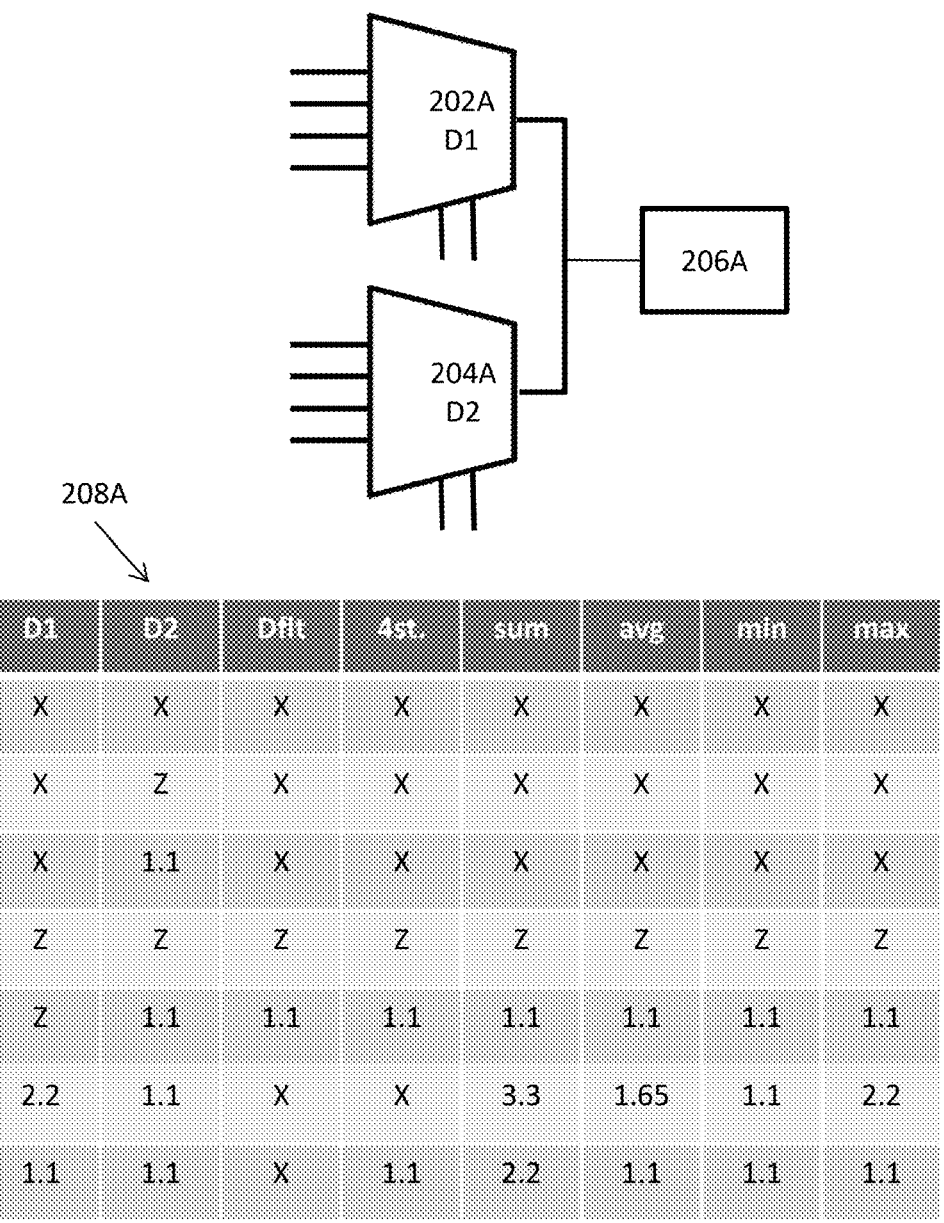
FIG. 2A provides an exemplary global selectable resolution functions for wreal nets.

For example, some embodiments may define and incorporate the following resolution functions into SystemVerilog to, for example, allow for incompatible connections: (1) "default" that is for single active driver with support for Z state; (2) "4state" that is substantially similar to Verilog 4-state resolution for digital nets; (3) "sum" that supports multiple drivers and resolves to a summation of all the driver values; (4) "avg" that supports multiple drivers and resolves to the average of all the driver values (e.g., values of wreal drivers); (5) "min" that supports multiple drivers and resolves to the least value of all the driver values; and (6) "max" that supports multiple drivers and resolves to the greatest value of all the driver values. FIG. 2A provides an exemplary global selectable resolution functions for wreal nets. More specifically, FIG. 2 shows two wreal drivers—Driver 1 (D1) 202A, Driver 2 (D2) 204A—that drive a receiver 206A. Table 208A shows the use of the aforementioned six resolution functions to resolve the values of the two drivers (202A and 204A) driving the receiver (206A).

In some embodiments, the method for implementing analog behavioral modeling and IP integration using SystemVerilog Hardware Description Language comprises the process 210 of correlating the built-in resolution functions in SystemVerilog with nettypes. An exemplary correlation between the built-in resolution function keywords, each representing a resolution as described above, and their respective equivalent wreal nettypes is illustrated in the table in FIG. 6B. It shall be noted that although wreal is widely recognized in Verilog-AMS as a real net data type representing a real-valued physical connection between structural entities, the term "wreal nettype", "wreal net", "wreal", or any other terms preceded with the term wreal used throughout this application generally refer to a real-valued net, a real-valued variable, a real-valued signal, or a real-valued expression, depending upon the circumstances in which the term is used, and does not explicitly or implicitly indicate any correlation with the wreal in Verilog-AMS, unless otherwise specifically recited or claimed. This table in FIG. 6B also provides a default correspondence between the resolution function keywords and the wreal nettypes that may be used in the declaration of nettypes and the nets of the declared nettypes. In some embodiments, the method correlates the built-in resolution functions in SystemVerilog with nettypes through discipline declaration as shown below:

discipline real_current;
  domain discrete;
  realresolve sum;
enddiscipline

These embodiments greatly improve upon the current approaches that intentionally avoid the inclusion of any Verilog-AMS specific elements (e.g., "domain" and "disciplines") in performing real number modeling (RNM) and thus do not exhibit the shortcoming of being unable to port existing Verilog-AMS models that include such VAMS specific elements.

In some embodiments, the method correlates the built-in resolution functions in SystemVerilog with nettypes through by default setting as shown below:

'default_realresolve sum

In these embodiments, the default setting takes effect where no other means are available to correlate the built-in resolution functions in SystemVerilog with nettypes.

In some embodiments, the method for implementing analog behavioral modeling and IP integration using SystemVerilog Hardware Description Language comprises the process 212 of resolving values of multiple wreal drivers that drive a receiver based at least in part upon the wreal resolution functions provided above. In some embodiments, the method resolves values of multiple wreal drivers that drive a receiver based at least in part upon the connectivity or usage of the wreal drivers. An example of resolving the values of multiple wreal drivers that drive a receiver is provided in FIG. 2A as described above.

In some embodiments, the method for implementing analog behavioral modeling and IP integration using SystemVerilog Hardware Description Language comprises the process 214 of correlating a wreal built-in nettype in SystemVerilog with the corresponding SystemVerilog built-in resolution functions that are equivalent to the resolution functions in Verilog-AMS for modeling analog or mixed-signal electronic circuit designs and may be used for real number modeling (RNM) directly in SystemVerilog or for porting Verilog-AMS models into SystemVerilog for utilizing, for example, the extensive verification features and an assertion language in SystemVerilog for verifying a mixed-signal design. An exemplary correlation is illustrated in the table of FIG. 6B.

In some embodiments, the method for implementing analog behavioral modeling and IP integration using SystemVerilog Hardware Description Language comprises the process 216 of providing native wreal capabilities in SystemVerilog by defining and incorporating the built-in wreal nettypes into SystemVerilog based on the correlation determined at 214. In some embodiments, the method for implementing analog behavioral modeling and IP integration using SystemVerilog Hardware Description Language comprises the process 218 of providing native wreal capabilities in SystemVerilog to declare unresolved real nettype as described above. In some embodiments, the method for implementing analog behavioral modeling and IP integration using SystemVerilog Hardware Description Language comprises the process 220 of migrating or porting a Verilog-AMS (VAMS) model to SystemVerilog by using at least the built-in nettypes or the unresolved real nettype.

FIG. 3 illustrates an exemplary analog event expression for an analog buffer with enable in some embodiments. More specifically, FIG. 3 shows a wreal to wreal translation via a buffer that also accommodates for X value for the wrealXState, Z value for the wrealZState, and enable signal. As shown in this exemplary analog event expression, some embodiments provide new analog event expressions with a buffer to help with wreal to wreal translation.

Figure 4:
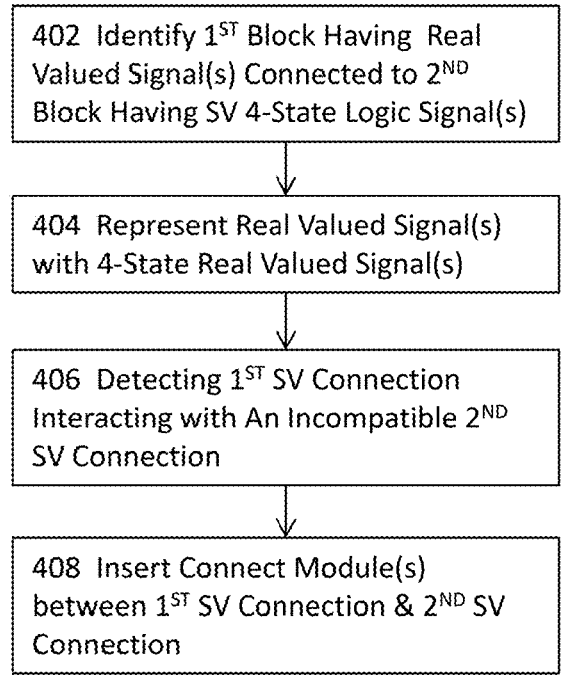
FIG. 4 illustrates a high level flow diagram for implementing analog behavioral modeling and IP (intellectual property) integration using SystemVerilog Hardware Description Language in some embodiments.

FIG. 4 illustrates a high level flow diagram for implementing analog behavioral modeling and IP (intellectual property) integration using SystemVerilog Hardware Description Language in some embodiments. More particularly, FIG. 4 illustrates the embodiments where blocks represented using SystemVerilog real signals may be connected directly or indirectly to other blocks that are represented using SystemVerilog 4-state logic or digital signals by detecting incompatible SystemVerilog connections and using connect module(s) to compute or determine equivalent values to resolve wire type incompatibility. A typical use example of the flow illustrated in FIG. 4 is full-chip verification in SystemVerilog of a mixed signal design that often includes multiple SystemVerilog wreal nets connecting electrical (analog) nets. In some embodiments, the method for implementing analog behavioral modeling and IP integration using SystemVerilog Hardware Description Language comprises the process 402 of identifying a first block having real valued signals (e.g., a Verilog-AMS analog block or a Verilog-AMS mixed-signal block having real valued signals) that is connected to a second block having SystemVerilog 4-state logic signals. In some embodiments, the method may comprise the process 404 of representing a real valued signal (e.g., a wreal signal in a Verilog-AMS block) with a 4-state signal ("0.0", "non-zero", "high-impedance", and "unknown"). Unlike Verilog-AMS where a real valued signal lacks the ability to represent the Unknown state and the High-Impedance state, these embodiments provides the ability to assign both the Unknown state and the High-Impedance state to the real-valued signal type. In other words, these embodiments provides support for promoting the wreal type to represent the Unknown and High-Impedance states, in addition to the "0.0" and "non-zero" states to accommodate common analog-mixed signal modeling scenarios. In some embodiments, the method may comprise the process 406 of detecting a first SystemVerilog interconnect, connection, or net that interacts with an incompatible second SystemVerilog interconnect, connection, or net. For example, the incompatible second SystemVerilog interconnect, connection, or net may comprise a logic or digital net. In some embodiments, the method may comprise the process 408 of inserting a connect module between the first SystemVerilog interconnect, connection, or net and the second SystemVerilog interconnect, connection, or net.

Figure 4A:
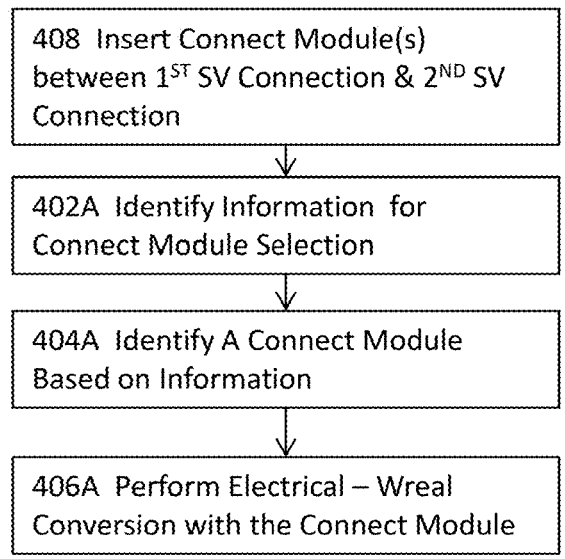
FIG. 4A illustrates a more detailed flow diagram for a part of the flow illustrated in FIG. 4 in some embodiments.

FIG. 4A illustrates a more detailed flow diagram for a part of the flow illustrated in FIG. 4 in some embodiments. More specifically, FIG. 4A illustrates more details about the process 408 of FIG. 4. In some embodiments, the process 408 may comprise the sub-process 402A of identifying data or information that is required or desired for the selection or identification of a connect module. The data or information may include, for example but not limited to, one or more disciplines, one or more port directions, or the actual port or net type(s) in the electronic design. That is, even with same disciplines and port directions, the method may further use the actual port or net type(s) to identify or select an appropriate connect module. In some embodiments, the process 408 may comprise the sub-process 404A of identifying a connect module based at least in part upon the data or information. In some embodiments, the process 408 may comprise the sub-process 406A of performing conversion (e.g., electrical-to-wreal conversion) by using at least the connect module. An example of electrical-to-wreal conversion is provided below:

connect E2R input electrical output ddiscrete;
connectmodule E2R (Ain, Dout);
input Ain;
electrical Ain; // input electrical
output Dout;
wreal Dout; // output wreal
ddiscrete Dout; // discrete domain
parameter real vdelta=1.8/64 from (0:inf); // voltage delta
parameter real vtol=vdelta/4 from (0:vdelta); // voltage tolerance
parameter real ttol=10p from (0:1 m] // time tolerance
real Dreg; //real register for A to D wreal conversion
assign Dout=Dreg;
   // discretize V(Ain) triggered by absdelta function
always @(absdelta(V(Ain), vdelta, ttol, vtol))
   Dreg=V(Ain);
endmodule More details about the absdelta system function for sampling will be described in subsequent paragraphs.

Figure 5:
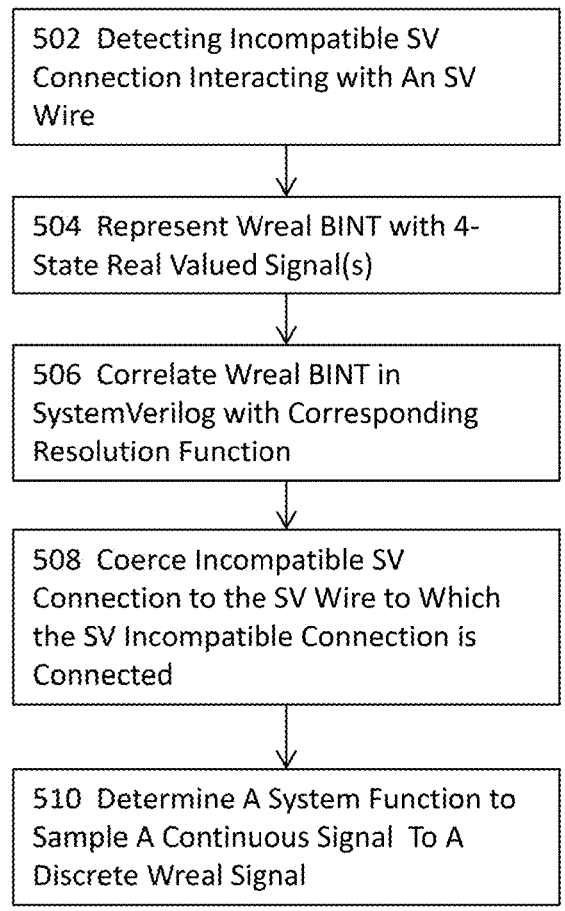
FIG. 5 illustrates a high level flow diagram for implementing analog behavioral modeling and IP (intellectual property) integration using SystemVerilog Hardware Description Language in some embodiments.

FIG. 5 illustrates a high level flow diagram for implementing analog behavioral modeling and IP (intellectual property) integration using SystemVerilog Hardware Description Language in some embodiments. More specifically, FIG. 5 illustrates an approach for coercing SystemVerilog wire to be a type compatible with the net to which the SystemVerilog wire is connected. In some embodiments, the method for implementing analog behavioral modeling and IP integration using SystemVerilog Hardware Description Language illustrated in FIG. 5 may comprise the process 502 of detecting incompatible a SystemVerilog connection (e.g., a net) that interacts with a SystemVerilog wire. In some embodiments, the method may further comprise the process 504 of representing nets of the wreal nettype with 4-state real-valued signals (e.g., "0.0", "non-zero", "high-impedance", and "unknown"). In some embodiments, the method may further comprise the process 506 of correlating a wreal built-in nettype in SystemVerilog with corresponding resolution functions that are equivalent to the resolution functions in Verilog-AMS. In some embodiments, the method may further comprise the process 508 of coercing the incompatible SystemVerilog connection with the SystemVerilog wire to which the incompatible SystemVerilog connection is connected. In some of these embodiments, the method performs the coercion without converting real or analog values to match those of the digital net or interconnect (the "wire"). In some embodiments, the method may further comprise the process 510 of determining a system function (e.g., the "absdelta( )" function in the aforementioned description of the flow diagram illustrated in FIG. 4A) to sample a continuous signal to a discrete wreal signal.

Figures 1, 2, 5A:
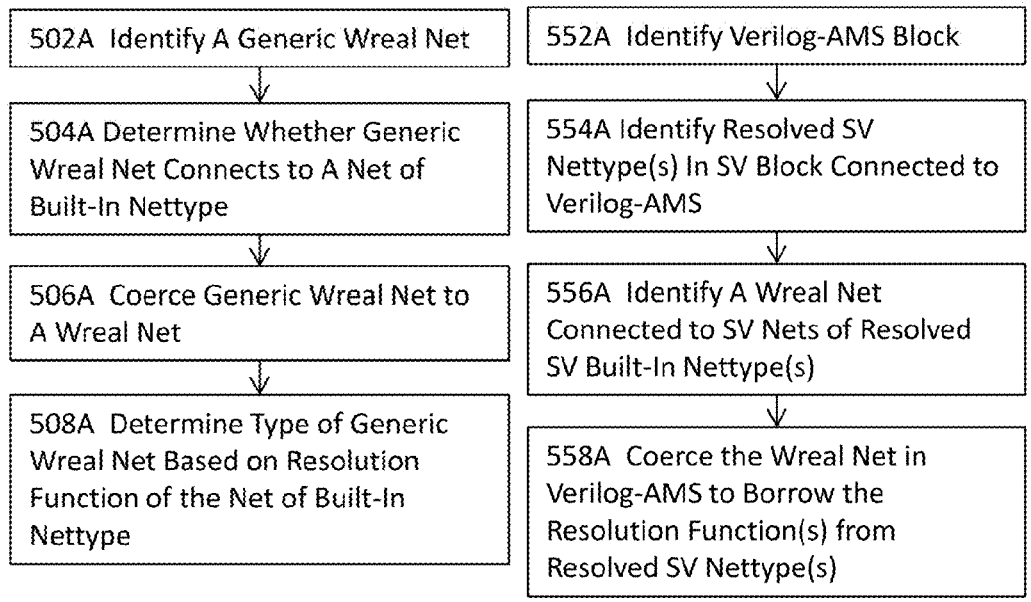

FIGS. 5A-1 and 5A-2 illustrate two high level flow diagrams for implementing analog behavioral modeling and IP integration using SystemVerilog Hardware Description Language in some embodiments. FIG. 5A-1 shows a method for implementing analog behavioral modeling and IP integration using SystemVerilog Hardware Description Language and comprises the process 502A of identifying a generic wreal net in some embodiments. In some embodiments, the method may further include a process 504A of determining whether the generic wreal net connects to a net of built-in nettype as described above. For example, the method may determine whether the generic wreal net connects to an electrical net in Verilog-AMS. In some embodiments, the method may further include a process 506A of coercing the generic wreal net to a wreal net. In some embodiments, the method may further include a process 508A of determining the type of the wreal net to which the generic wreal net is connected based at least in part upon the resolution function of the net of the built-in nettype. In some of these embodiments, the method may identify resolution function of the net of the built-in nettype by looking up the mapping between the built-in nettype and the corresponding resolution function in data structure such as the table shown in FIG. 6B.

Figure 5B:
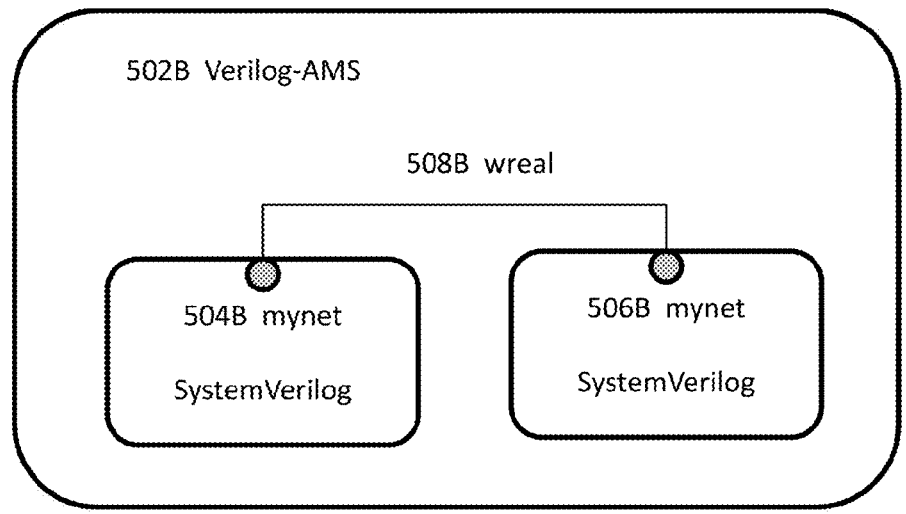
FIG. 5B illustrates a working example for the high level flow diagrams for implementing analog behavioral modeling and IP (intellectual property) integration using SystemVerilog Hardware Description Language illustrated in FIG. 5A-2 in some embodiments.

FIG. 5A-2 illustrates a process for implementing analog behavioral modeling and IP integration using SystemVerilog Hardware Description Language with an exemplary working example shown in FIG. 5B. More particularly, FIG. 5B shows a hierarchical design where the Verilog-AMS block 502B includes two resolved SystemVerilog blocks —504B and 506B. FIGS. 5A-2 and 5B also show the connection to the Verilog-AMS block 502B with two resolved SystemVerilog nets—mynet 504B and mynet 506B. The two resolved SystemVerilog nets 504B and 506B are connected via the connection 508B through the Verilog-AMS block 502B. In some embodiments, the method for implementing analog behavioral modeling and IP integration using SystemVerilog Hardware Description Language illustrated in FIG. 5A-2 includes the process 552A of identifying a Verilog-AMS block that includes two nets of one or more resolved SystemVerilog built-in nettypes. In some embodiments, the method may further comprise the process 554A of identifying the one or more resolved SystemVerilog built-in nettypes for the SystemVerilog blocks connected to the Verilog-AMS block. In some embodiments, the method may further comprise the process 556A of identifying a wreal net 508B that is connected to the two nets of one or more resolved SystemVerilog built-in nettypes. In some embodiments, the method may further comprise the process 558A of coercing the wreal net 508B in the Verilog-AMS block to a predefined built-in wreal nettype based at least in part upon the resolution functions corresponding to the one or more resolved SystemVerilog built-in nettypes of the nets 504B and 506B. For example, the method may identify the wreal nettype for the wreal net 508B by identifying the built-in nettype by using the resolution function of the two nets 504B and 506B in some embodiments.

The following shows an example of connecting a net of built-in nettype to a generic wreal net by looking up the wreal type that corresponds to the net of built-in nettype's resolution function in a data structure such as the table in FIG. 6B.

```
nettype real myRealAvg with CDS_res_wrealavg; //
   declare a built-in nettype module top( );
   myRealAvg x;
   mid M(x);
endmodule
module mid(wr); // wr is a generic wreal
   child C(wr);
endmodule
module child (inout myRealAvg y);
endmodule
```

In the above example, the generic wreal net top.M.wr obtains a resolved type of wrealavg because the nettype myRealAvg has resolution function CDS_wrealavg_res that corresponds to the wreal type wrealavg in the table in FIG. 6B. In some embodiments where connections of generic wreal nets to unresolved nettypes, the method may coerce the generic wreal to a special unresolved wreal net and enforce the final simulated net to have a single driver in some embodiments. Consequently, it may be possible that a generic wreal model errors out when connected to an unresolved nettype if it has internal driver(s) on the generic wreal net.

Figure 5C:
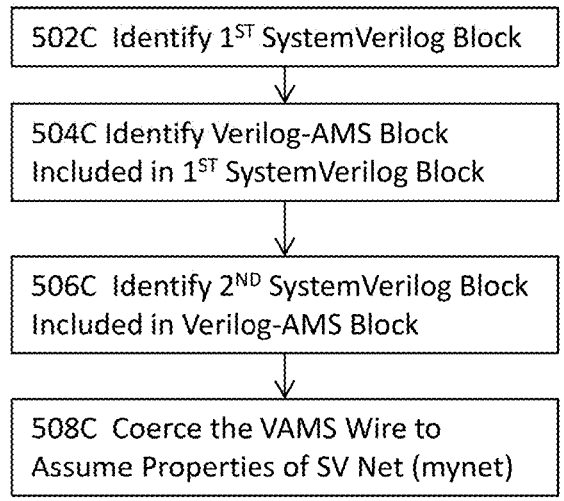
FIG. 5C illustrates a high level flow diagram for implementing analog behavioral modeling and IP (intellectual property) integration using SystemVerilog Hardware Description Language in some embodiments.
Figure 5D:
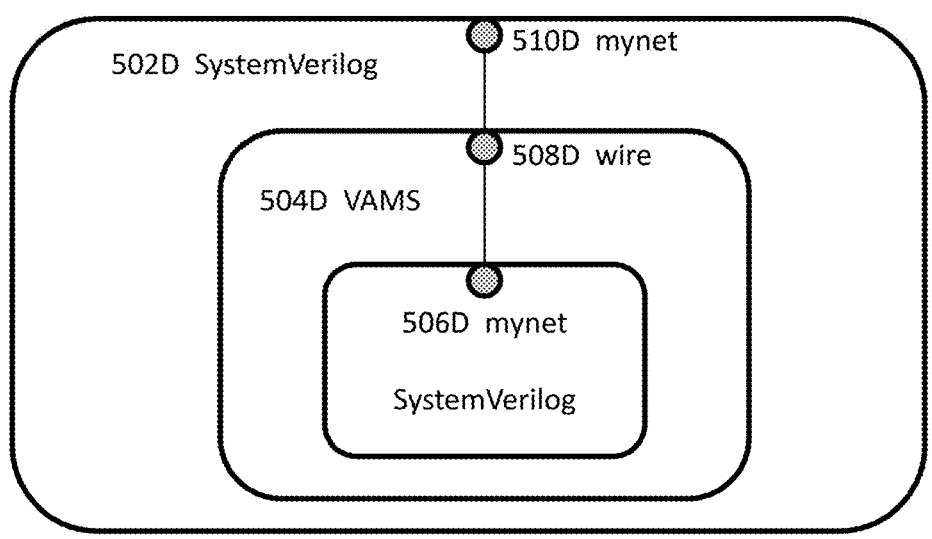
FIG. 5D illustrates a working example for the high level flow diagram for implementing analog behavioral modeling and IP (intellectual property) integration using SystemVerilog Hardware Description Language illustrated in FIG. 5C in some embodiments.

FIG. 5D illustrates a working example for the high level flow diagram for implementing analog behavioral modeling and IP integration using SystemVerilog Hardware Description Language illustrated in FIG. 5C in some embodiments. More specifically, FIG. 5C shows a hierarchical design in which a SystemVerilog block 502D includes a Verilog-AMS block 504D which in turn includes a child SystemVerilog block 506D. FIG. 5D further illustrates the hierarchical connection across the SystemVerilog and Verilog-AMS boundaries and passing from a SystemVerilog mynet 506D via a Verilog-AMS wire 508D to another SystemVerilog mynet 510D. In FIG. 5D, mynet may be declared by, for example, the exemplary command of "nettype real mynet use CDS_res_wrealavg;" (without the quotation marks.)

FIG. 5C illustrates a high level flow diagram for implementing analog behavioral modeling and IP (intellectual property) integration using SystemVerilog Hardware Description Language in some embodiments. More specifically, FIG. 5C illustrates that some embodiments may coerce the Verilog-AMS wire 508D to assume the nettype of the SystemVerilog nets of built-in nettype. In some embodiments, the method illustrated in FIG. 5C includes the process 502C of identifying a first SystemVerilog block. In some embodiments, the method illustrated in FIG. 5C includes the process 504C of identifying a Verilog-AMS block that is included as a child block in the first SystemVerilog block identified at 502C. In some embodiments, the method illustrated in FIG. 5C includes the process 506C of identifying a second SystemVerilog block that is included as a child block in the Verilog-AMS block identified at 504C. In some embodiments, the method illustrated in FIG. 5C includes the process 508C of coercing the Verilog-AMS wire to have the properties of the net (506D or 510D) in the SystemVerilog blocks by, for example, using the resolution function of the SystemVerilog nets (506D or 510D) with reference to the mapping between the resolution functions and corresponding built-in nettypes stored in a data structure (e.g., the table shown in FIG. 6B).

Figures 1, 2, 5E:
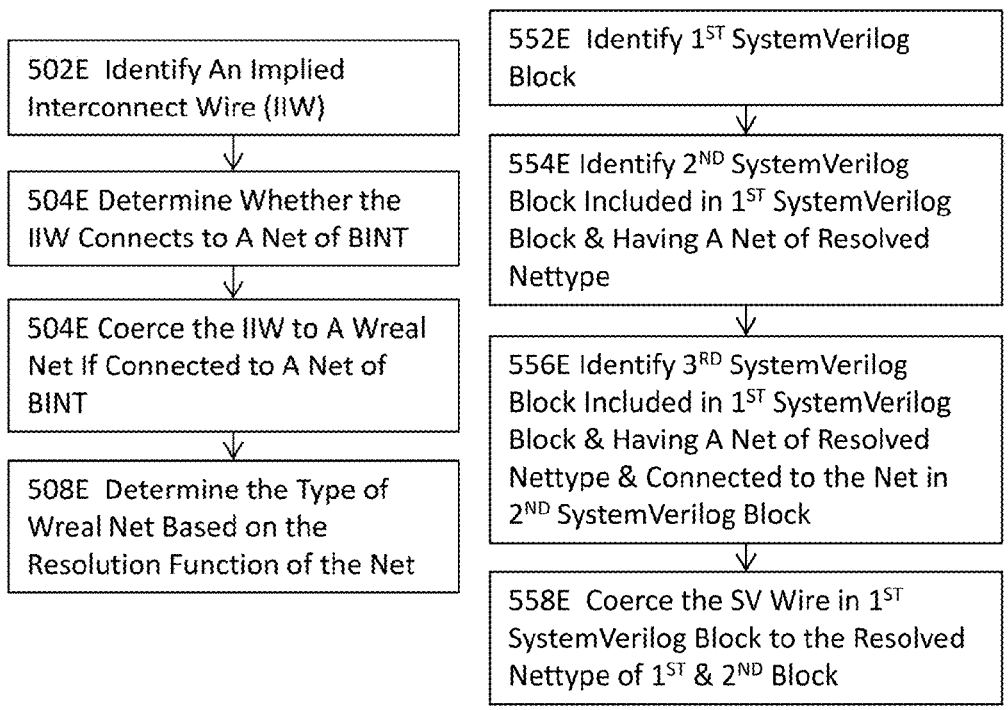
Figure 5F:
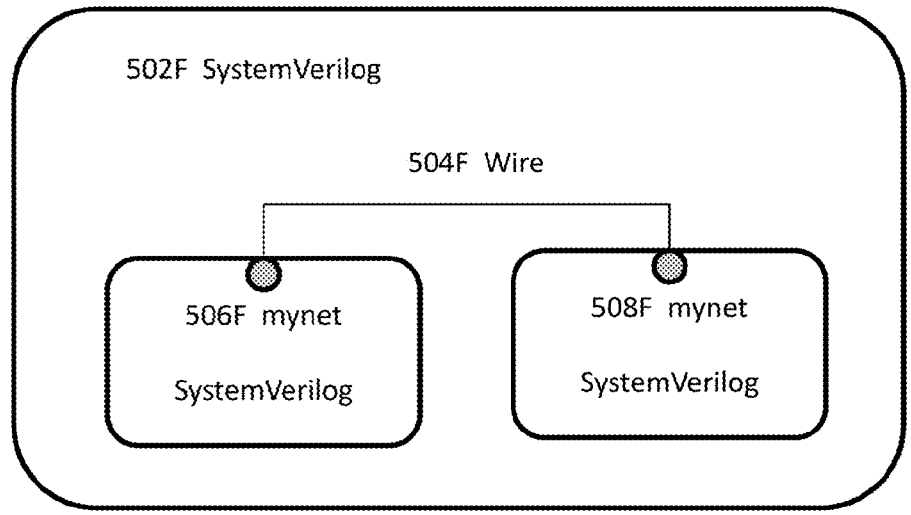
FIG. 5F illustrates a working example for the high level flow diagrams for implementing analog behavioral modeling and IP (intellectual property) integration using SystemVerilog Hardware Description Language illustrated in FIG. 5E-2 in some embodiments.

FIGS. 5E-1 and 5E-2 illustrate two high level flow diagrams for implementing analog behavioral modeling and IP integration using SystemVerilog Hardware Description Language in some embodiments. FIG. 5F illustrates a working example for the high level flow diagrams for implementing analog behavioral modeling and IP integration using SystemVerilog Hardware Description Language illustrated in FIG. 5E-2 in some embodiments. More specifically, FIG. 5F illustrates a hierarchical design including a parent SystemVerilog block 502F that includes two child SystemVerilog blocks—506F and 508F. The two child SystemVerilog blocks 506F and 508F, both of which with a resolved nettype, are connected via a wire 504F in the parent SystemVerilog block 502F. In FIG. 5F, the net of built-in nettype (mynet) may be declared by, for example, the exemplary command of "nettype real mynet use CDS_res_wrealavg;" (without the quotation marks.)

FIG. 5E-2 illustrates an approach that coerces the SystemVerilog wire 504F to the built-in nettype of the two SystemVerilog nets (506F and 508F) based at least in part upon the connectivity of the SystemVerilog wire 504F to the child ports. In some embodiments, such a coerced SystemVerilog wire 504F may be referred to as an "implied interconnect." In some embodiments, the method illustrated in FIG. 5E-2 includes the process 552E of identifying a first SystemVerilog block. In some embodiments, the method may further include the process 554E of identifying a second SystemVerilog block that is included as a child block in the first SystemVerilog block identified at 552E. In these embodiments, the second SystemVerilog block has a net of a resolved built-in nettype. In some embodiments, the method may further include the process 556E of identifying a third SystemVerilog block that is also included as a child block in the first SystemVerilog block identified at 552E. In these embodiments, the third SystemVerilog block has a net of a resolved built-in nettype and is connected to the second SystemVerilog block identified at 554E. In some embodiments, the method may further include the process 558E of coercing the SystemVerilog wire, through which the first and the second SystemVerilog blocks are connected, in the first SystemVerilog block to the resolved built-in nettype of the first and the second SystemVerilog blocks. In some embodiments, an implied interconnect distinguishes from, for example, SystemVerilog interconnect nets that are declared with the "interconnect" keyword and comprises any built-in SystemVerilog net (e.g., wire, wand, or wor, etc.) that is analyzed or determined to have the capability of being treated as an interconnect net. In these embodiments, the types of these nets from their respective declared type may be changed into a real-valued nettype based at least in part upon the connectivity information.

The following shows an example of connecting an implied interconnect to a net of built-in nettype and the coercion of the implied interconnect to a wreal net with a type determined by looking up the wreal type that corresponds to the net of built-in nettype resolution function in a data structure such as the table in FIG. 6B.

```
nettype real myRealAvg with CDS_res_wrealavg; //
   declare a built-in nettype module top( );
   myRealAvg x;
   mid M(x);
endmodule
module mid(inout wire ii); // ii is an implied interconnect
   child C(ii);
endmodule
``` module child (inout myRealAvg y);
endmodule

In the above example, the implied interconnect net top-.M.iii may coerce to a wrealavg net because the nettype myRealAvg has resolution function CDS_wrealavg_res that corresponds to the wreal type wrealavg in, for example, the table in FIG. 6B.

Figure 5G:
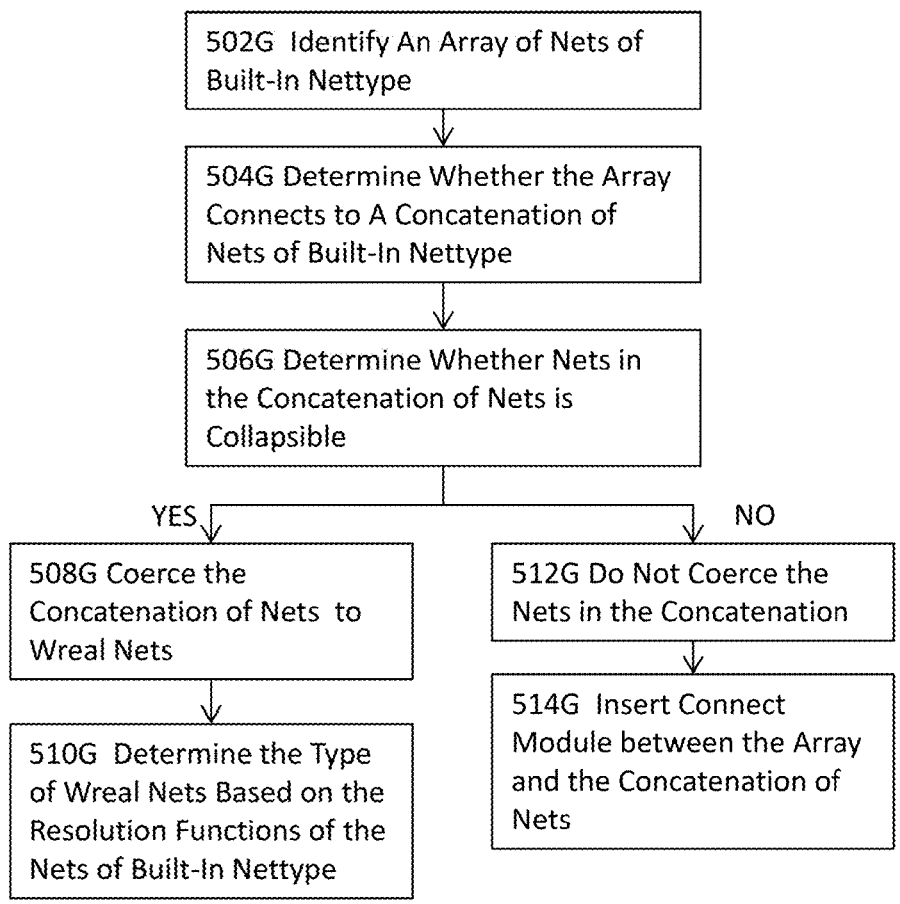
FIG. 5G illustrates a flow diagram for implementing analog behavioral modeling and IP (intellectual property) integration using SystemVerilog Hardware Description Language in some embodiments.

FIG. 5G illustrates a flow diagram for implementing analog behavioral modeling and IP integration using SystemVerilog Hardware Description Language in some embodiments. More specifically, FIG. 5G shows a process that may include the process 502G of identifying an array of nets of a built-in nettype in some embodiments. In some embodiments, the method may further comprise the process 504G of determining whether or not the array of nets connects to a concatenation of nets of built-in nettype. In some embodiments, the method may further comprise the process 506G of determining whether the nets in the concatenation of nets are collapsible. In some of these embodiments where process 506G determines that the concatenation is collapsible, the method may further include the process 508G of coercing all the nets in the concatenation of nets that are collapsible to wreal and the process 510G of determining the type of the resulting wreals based on the resolution function of the nets of built-in nettype.

For example, the nettype of the coerced wreal nets may be determined from looking up the wreal type that corresponds to resolution function of the net of built-in nettype in, for example, the table shown in FIG. 6B. In some other embodiments, where the process 506G determines that some nets in the concatenation are not collapsible, the method may further include the process 512G of not coercing these nets that are not collapsible and the process 514G of inserting a connect module as described in some of the preceding paragraphs with reference to FIGS. 4 and 4A. In some embodiments where the array of nets of built-in nettype is connected to a non-collapsible concatenation of expression, the method will not perform the coercion. In some of these embodiments, coercion will not be performed even if some of the elements in the concatenation would otherwise be coercible.

Figure 5H:
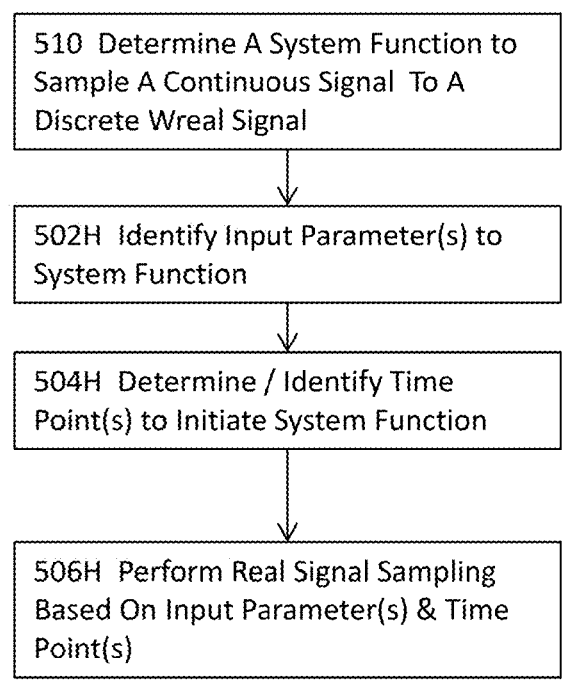
FIG. 5H illustrates a flow diagram for implementing analog behavioral modeling and IP (intellectual property) integration using SystemVerilog Hardware Description Language in some embodiments.

FIG. 5H illustrates a flow diagram for implementing analog behavioral modeling and IP (intellectual property) integration using SystemVerilog Hardware Description Language in some embodiments. More specifically, FIG. 5H illustrates more details about the process 510 of determining a system function to sample a continuous signal to a discrete wreal signal of FIG. 5. In some embodiments, the method may include the process 502H of identifying one or more input parameters to the system function. The input parameters may include, for example but not limited to, time tolerance(s), voltage tolerance(s), voltage delta, rise/fall time, etc. in some embodiments. In some embodiments, the use may provide at least one of the input parameters. An exemplary system function may thus be: absdelta (expr, delta [, time_tol [, expr_tol]]). In some embodiments, the method may include the process 504H of identifying or determining one or more time points to initiate and perform the system function. In some embodiments, such a system function may be triggered at time zero, when an analog solver finds a stable solution, when the expr value changes more than delta plus or minus expr_tol relative to the previous absdelta event (but not when the current time is within time_tol of the previous absdelta event), or when expr changes direction (but not when the amount of the change is less than expr_tol.)

Figure 6:
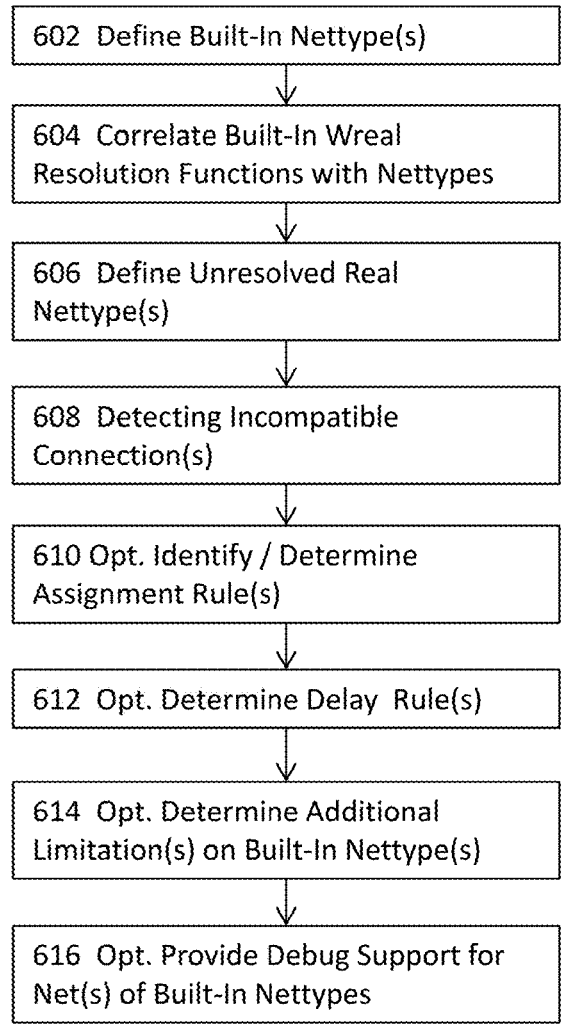
FIG. 6 illustrates a high level diagram for implementing analog behavioral modeling and IP (intellectual property) integration using SystemVerilog Hardware Description Language in some embodiments.

FIG. 6 illustrates a high level diagram for implementing analog behavioral modeling and IP (intellectual property) integration using SystemVerilog Hardware Description Language in some embodiments. In some embodiments, the method may comprise the process 602 of defining or declaring built-in nettypes in a substantially similar as that described with reference to process 204 of FIG. 2. Once the built-in nettypes are defined or declared, the method may then declare one or more nets of built-in nettypes. In some embodiments, the method may comprise the process 604 of correlating the wreal resolution functions built into SystemVerilog with the built-in nettypes declared at 602. In some embodiments, an exemplary correlation between the wreal resolution functions built into SystemVerilog and the built-in nettypes is shown in a data structure such as the table in FIG. 6B. In some embodiments, the method may comprise the process 606 of defining or declaring one or more unresolved nettypes in a substantially similar manner as that described with reference to reference character 218 of FIG. 2 or the exemplary syntax in ¶¶ [0047]-[0048].

In some embodiments, the method may comprise the process 608 of detecting incompatible connections. In some of these embodiments, the process 608 may include a sub-process of identifying port connection rules from, for example, §23.3.3 of the SystemVerilog Language Reference Manual. The process 608 will be described in greater details with reference to FIG. 6A. In some embodiments, the method may optionally comprise the process 610 of identifying or determining one or more assignment rules. In these embodiments, the assignment rules may require that nets of built-in nettype may appear on the left-hand side of a continuous assignment or the right-hand side of a procedural or procedural continuous assignment. In addition or in the alternative, assignments that include nets of built-in nettype(s) follow the rules for assignment compatibility is §6.22.3 of the SystemVerilog Language Reference Manual.

In some embodiments, the method may optionally comprise the process 612 of determining one or more delay rules. In these embodiments, nets of built-in nettype(s) may have the net delays. In some of these embodiments, nets of built-in nettype(s) are limited to a single delay value. In some embodiments, the method may optionally comprise the process 614 of determining one or more additional limitations on built-in nettypes. In these embodiments, nets of built-in nettype(s) follow the rules as prescribed in the SystemVerilog Language Manual. In addition to these rules prescribed in the SystemVerilog LRM, nets of built-in nettype(s) may not include multi-dimensional arrays in some embodiments. In some embodiments, nets of built-in nettypes may not be on the left-hand side of a force or a release statement. In some embodiments, the method may optionally comprise the process 616 of providing debugging support for nets of built-in nettypes declared by various processes described herein. Process 616 may provide the same level, as what wreal nets enjoy in Verilog-AMS, of debugging capabilities for nets of built-in nettypes. In some embodiments, process 616 may provide the capability to probe a net of built-in nettype, to display a net of built-in nettype's value in a waveform viewer, to display a value of a net of built-in nettype when hovering over it in the display with a pointing device such as a computer mouse, to represent a net of built-in nettype in the source and in a design browser, or to represent a net of built-in nettype in a schematic browser.

Figure 6A:
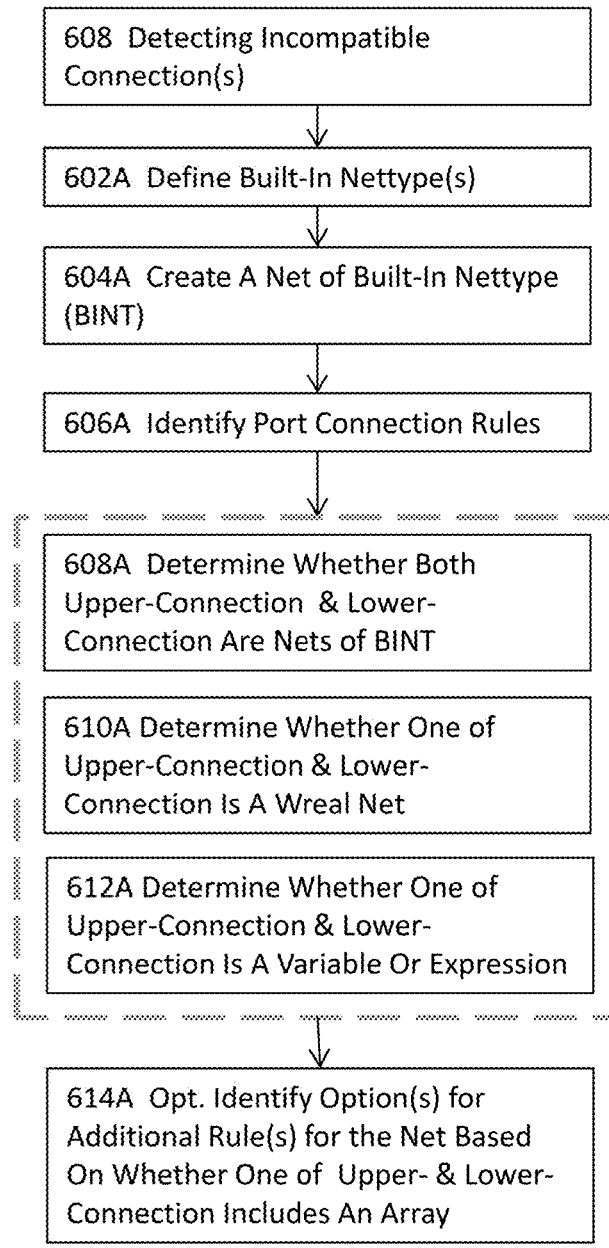
FIG. 6A illustrates a more detailed diagram for a part of the flow diagram illustrated in FIG. 6 in some embodiments.

FIG. 6A illustrates a more detailed diagram for a part of the flow diagram illustrated in FIG. 6 in some embodiments. More specifically, FIG. 6A describes more details about the process 608 of detecting incompatible connection(s). In some embodiments, the process 608 may comprise the sub-process 602A of defining or declaring one or more built-in nettypes for an electronic design if the one or more built-in nettypes have not been declared at 602. In some embodiments, the process 608 may comprise the sub-process 604A of creating a net of the built-in nettype declared at 602 or 602A. In some embodiments, the process 608 may comprise the sub-process 606A of identifying one or more port connection rules. For example, the process 606A may identify the one or more port connection rules from §23.3.3 of the SystemVerilog LRM.

In some embodiments, the process 606A may determine whether both the upper-connection and the lower-connection are nets of the built-in nettype. In these embodiments, the process 606A may require that both the upper- and the lower-connection have matching nettype as governed by the matching nettype rules in §6.22.6 of the SystemVerilog LRM and merge the port into a single simulated net. In some embodiments, the process 608 may comprise the sub-process 608A of determining whether both the upper- and the lower-connection comprise only nets of the built-in nettype. In some embodiments, the process 608 may comprise the sub-process 610A of determining whether one of the upper- and the lower-connection comprises a wreal net. In some embodiments, the process 608 may comprise the sub-process 612A of determining whether one of the upper- and the lower-connection comprises a variable or expression.

The following describes more details about the sub-processes 608A, 610A, and 612A. In some embodiments where both the upper- and the lower-connection are of the built-in nettype but either the upper- or the lower-connection comprises an array of nets of the built-in nettype, the process 608A may then require that both the upper- and the lower-connection have assignment compatible datatype as described in §6.22.3 of the SystemVerilog LRM, and their elements have matching nettype as described in §6.22.6 of the SystemVerilog LRM. The process 608A may further merge the port into a single simulated net.

In some other embodiments, the process 610A may determine whether one of the upper- and the lower-connection is a net of the built-in nettype, and the other is a wreal net. In these embodiments, the process 610A may require that the resolution functions of the nets of the built-in nettype match the wreal type as illustrated in the table of FIG. 6B if the process 610A further determines that both the upper- and the lower-connection comprise singular nets rather than an array of nets. The process 610A may further merge the port into a single simulated net. In some other embodiments, the process 610A may require that both the upper- and the lower-connection have assignment compatible datatype as described in §6.22.3 of the SystemVerilog LRM if the process 610A further determines that either the upper- or the lower-connection comprise an array of nets. In addition or in the alternative, the process 610A may require that the resolution of the element nettype of the net of the built-in nettype match the wreal type from the table of FIG. 6B. The process 610A may further merge the port into a single simulated net. In these embodiments described with reference to FIGS. 6 and 6A, the method utilizes the one or more port connection rules and assumes that wreal coercion as described with reference to FIGS. 4 and 4A has already occurred, and that all generic wreal nets have been resolved to a type.

In some embodiments where the process 612A determines that one of the upper- and the lower-connection is a net of the built-in nettype and the other is a variable or expression, the process 612A may require that the datatype of the variable or expression comprises a singular real when the process 612A further determines that the net of the built-in nettype is a singular net. The process 612A may further require that the port be a mode input or output, and that the connection be treated as a continuous assignment from the source to sink. In some other embodiments where the process 612A further determines that the net of the built-in nettype includes an array of nets, then the process 612A may further require that the upper- and the lower connection have assignment compatible datatype, that the element datatype of the non-net be real, that the port be of mode input or output, and that the connection be treated as a continuous assignment from the source to the sink.

In some embodiments, the process 608 may optionally comprise the sub-process 614A of identifying one or more options for the net(s) based at least in part upon whether one of the upper- and the lower-connection comprises an array of nets. For example, the process 614A may identify a -nettype_port_relax option or other options which, when sent to the integrated simulation or verification environment, impose one of more additional rules governing the connections between a net of the built-in nettype to another net of the built-in nettype. In some of these embodiments where the option is identified by process 614A, the process 614A may further determine whether both nets are singular nets. The process 614A may then require that the resolution of both nets of the built-in nettype be the same and merge the port into a single simulated net. In some other embodiments where the process 614A determines that either net of the two nets includes an array of nets, the process 614A may require that both nets have assignment compatible datatype as described in §6.22.3 of the SystemVerilog LRM. The process 614A may allow size mismatches when connecting to other nettypes or wreals. In addition or in the alternative, the process 614A may require that the resolution functions of the element nettypes be identical and may merge the port into a single simulated port.

FIG. 6B illustrates a more detailed diagram for a part of the flow diagram illustrated in FIG. 6 in some embodiments. More specifically, FIG. 6B illustrates an exemplary mapping between the built-in resolution functions keywords in SystemVerilog and their corresponding wreal types for the processes 210, 214, 506, or 604. It shall be noted that the keywords and the wreal types used in the table of FIG. 6B are merely illustrative, and thus other keywords or types may also be used.

Figure 6C:
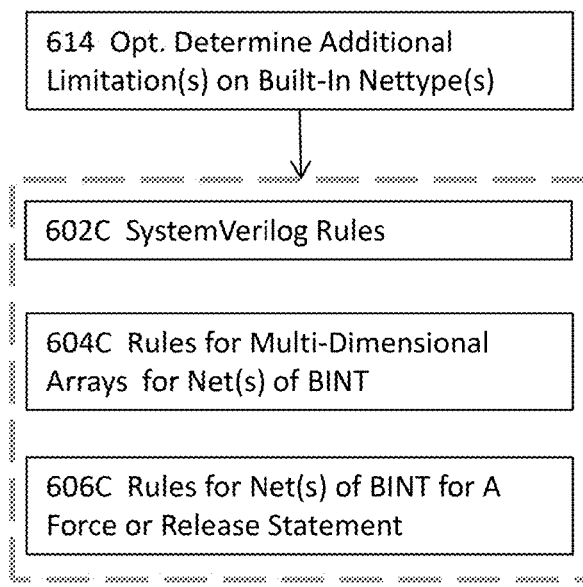
FIG. 6C illustrates a more detailed diagram for a part of the flow diagram illustrated in FIG. 6 in some embodiments.

FIG. 6C illustrates a more detailed diagram for a part of the flow diagram illustrated in FIG. 6 in some embodiments. More specifically, FIG. 6C illustrates more details about the process 614. In some embodiments, the one or more additional limitations on built-in nettypes may include SystemVerilog rules 602C, one or more rules 604C for multi-dimensional arrays for one or more nets of built-in nettype(s), or one or more rules 606C for one or more nets of built-in nettype(s) for a force or a release statement.

For example, if the one or more rules 604C disallow multi-dimensional arrays for one or more nets of built-in nettype(s), the following will not be allowed: "wreal y[0:3][0:5];".

Figure 7:
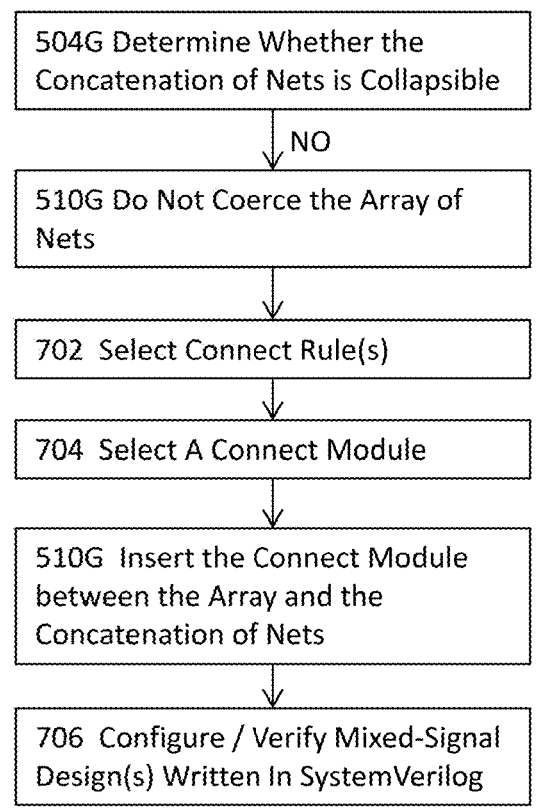
FIG. 7 illustrates a mode detailed flow diagram for a part of the flow diagram illustrated in FIG. 5G in some embodiments.

FIG. 7 illustrates a mode detailed flow diagram for a part of the flow diagram illustrated in FIG. 5G in some embodiments. In one or more embodiments, the method illustrated in FIG. 7 may comprise the process 504G of determining whether the concatenation of nets is collapsible. In some embodiments where the process 504G determines that the concatenation of nets is not collapsible, the method may further comprise the process 510G of not coercing the array of nets. The method may also include the process 702 of selecting or identifying one or more connect rules in some embodiments. For example, a user or the computer system may identify the one or connect rules. In some embodiments, the method may further comprise the process 704 of selecting a connect module based at least in part upon the one or more connect rules identified or selected at 702. The method may then proceed to 510G to insert the connect module between the array of nets and the concatenation of nets. In some embodiments, the method may further comprise the process 706 of configuring, simulating, or verifying a mixed-signal design that is written in SystemVerilog. In the embodiments illustrated in FIG. 7, the method identifies and inserts the connect module into the design of interest when an array of nets is connected to a non-collapsible concatenation.

Figure 7A:
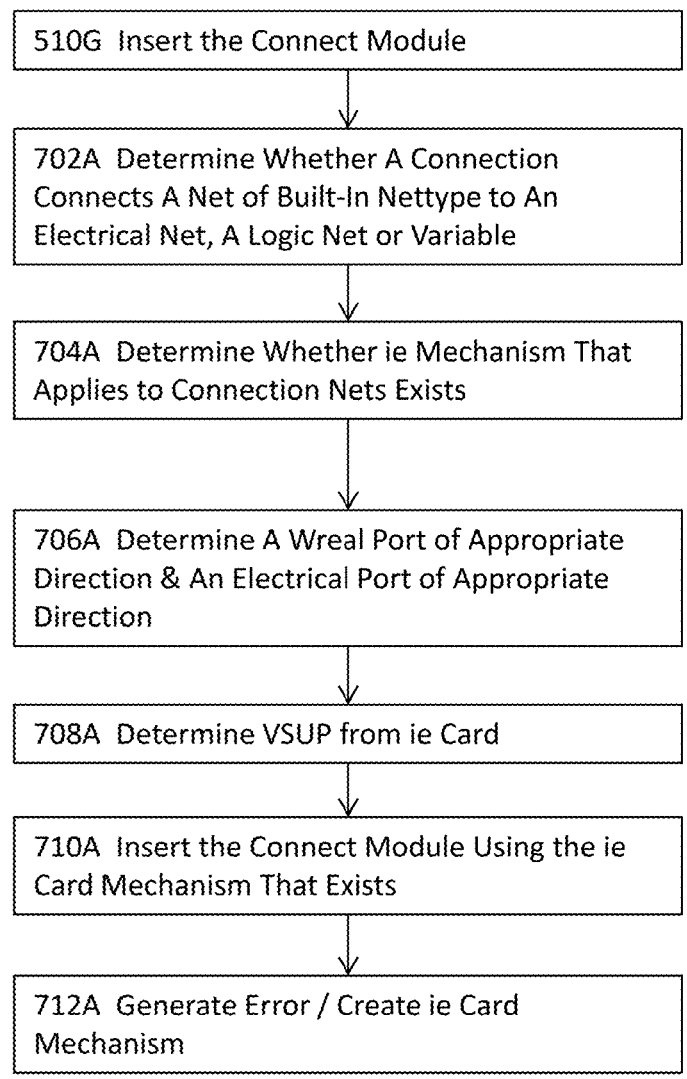
FIGS. 7A-B illustrate two mode detailed flow diagrams, each representing a part of the flow diagram illustrated in FIG. 5G in some embodiments.
Figure 7B:
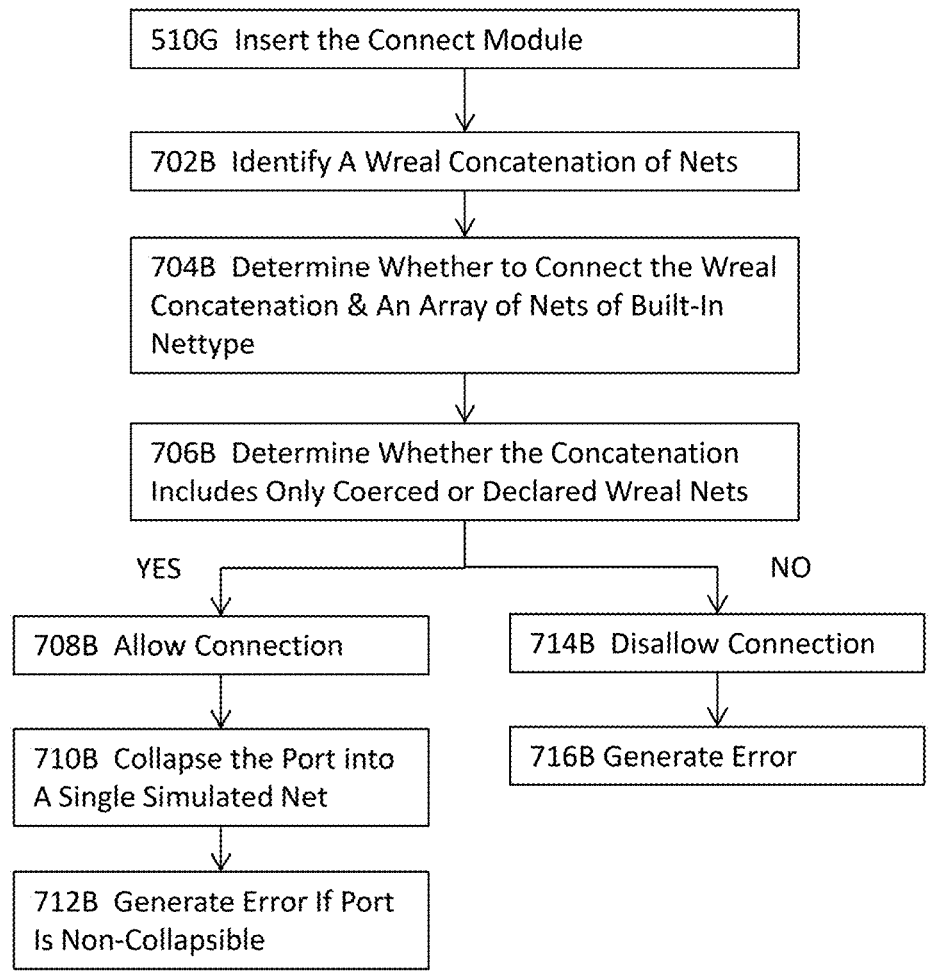

FIGS. 7A-B illustrate two mode detailed flow diagrams, each representing a part of the flow diagram illustrated in FIG. 5G in some embodiments. More specifically, FIG. 7A illustrates more details about the process 510G. In one or more embodiments, the process 510G may comprise the process 702A of determining whether a connection is to connect a net of the built-in nettype to an electrical net (e.g., an analog net), a logic net (e.g., digital), or a variable. In some embodiments, the process 510G may comprise the process 704A of determining whether a mechanism that applies to the connection or selects a connect module exists. In some of these embodiments, the process 704A may determine whether an ie card mechanism exists. In some embodiments where the mechanism (e.g., an ie card statement or ie card specifications in some of these embodiments) is determined to exist, the process 510G may comprise the process 706A of determining a wreal port of an appropriate direction and an electrical port of an appropriate direction.

In these embodiments, the process 510G may further comprise the process 708A of determining the supply voltage—vsup—from a mechanism that may be used to select the supply voltage. Some exemplary mechanisms for determining the supply voltage may include but not be limited to an ie card mechanism, a mechanism supporting inherited connections, a mechanism supporting supply sensitivity, and a mechanism supporting CPF (Si2 Common Power Format) or UPF (IEEE Unified Power Format) methods. The supply voltage—vsup—is a required parameter in an "ie" command that specifies one or more interface element parameters in an ie card mechanism. In some embodiments, the process 510G may comprise the process 710A of inserting the connect module using the ie card mechanism that is determined to exist. In some embodiments where the process 704A determines that an ie card mechanism does not exist, the process 510G may comprise the process 712A of generating an error without inserting a connect module or creating an ie card mechanism that applies to the connection for inserting the connect module. For example, some embodiments illustrated in FIG. 7A insert Verilog-AMS wreal connect module(s) on one or more nets of built-in nettype by using the ie card mechanism. In some embodiments, the method illustrated in FIG. 7 requires either the upper- or the lower-connection be a net for a connect module to be inserted. The following code illustrates an exemplary design with two identical modules in different power domains.

```
nettype real myNT with CDN_res_wrealsum; //built-in
  nettype with wrealsum resolution
module top( );
  mid M1( ); // vsup=1.8
  mid M2( ); // vsup=3
endmodule
module mid( );
  wire x; //logic wire because of assignment
  assign x=1'b1;
  child C(x);
endmodule
module child(input myNT y);
  always @(y) $display("% m.y=% f", y);
endmodule
```

The following code illustrates the use of the ie card mechanism to assign each instance of module mid to a different power domain

```
amsd {
  ie vsup=1.8 inst=top.M1;
  ie vsup=3 inst=top.M2;
}
```

After coercion and connect module selection or identification, the method may insert two connect modules: (1) an L2R connect module from top.M1.x to top.M1.y with vsup=1.8, and (2) an L2R connect module from top.M2.x to top.M2.y with vsup=3 in the above example.

FIG. 7B illustrates more details about the process 510G of inserting the connect module in some embodiments. In one or more embodiments, the process 510G may comprise the sub-process 702B of identifying a wreal concatenation of nets. In some embodiments, the process 510G may comprise the sub-process 704B of determining whether the wreal concatenation is connected to an array of nets of built-in nettype. In some embodiments, the process 510G may comprise the sub-process 706B of determining whether the concatenation of nets includes only coerced or declared wreal nets. In some embodiments where the process 706B determines that the concatenation of nets includes only coerced or declared wreal nets, the process 510G may further comprise the sub-process 708B of allowing the connection between the wreal concatenation of nets and the array of nets of built-in nettype. In these embodiments, the process 510G may further include the sub-process 701B of collapsing the port into a single simulated net and the sub-process 712B of generating an error if the port is not collapsible.

In some embodiments where the sub-process 706B determines that the wreal concatenation of nets does not include only coerced or declared wreal nets, the process 510G may further comprise the sub-process 714B of disallowing the connection between the wreal concatenation of nets and the array of nets of built-in nettype and the sub-process 716B of generating an error. In some embodiments, the process 510G applies the unpacked array concatenation rules in §10.10 of the SystemVerilog LRM to the wreal concatenation of nets of built-in nettype. In some embodiments, the process 510G or its parent process or method discards or ignores inherited connections on nets of a built-in nettype.

Figure 8:
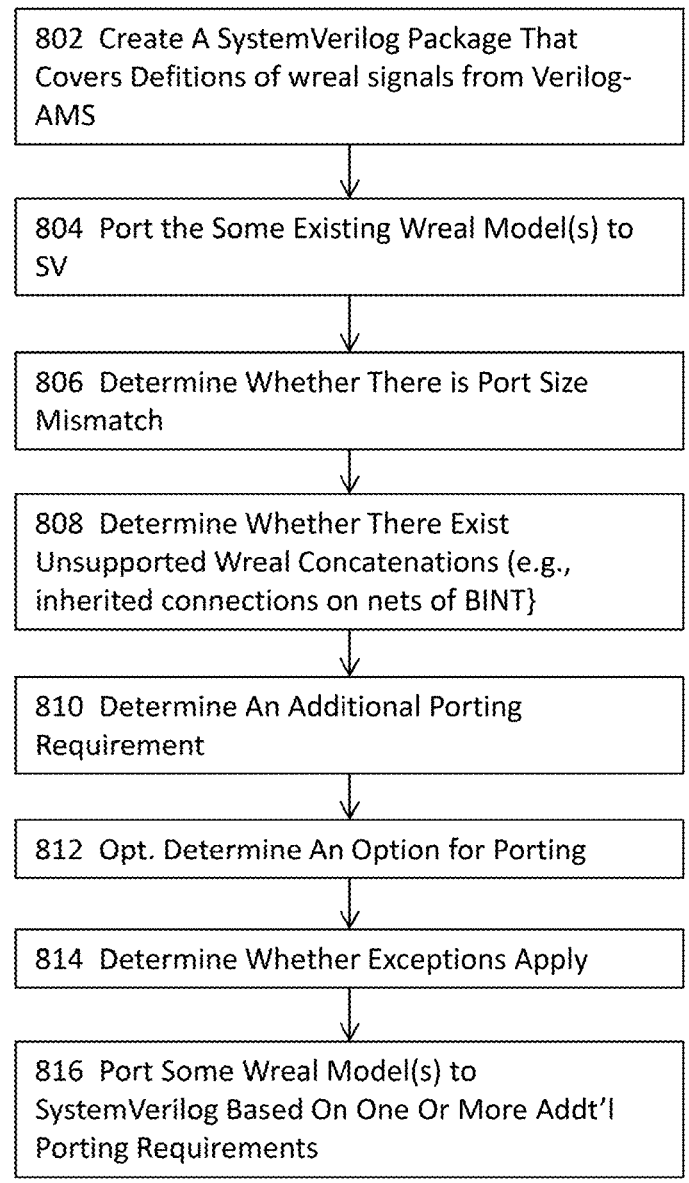
FIG. 8 illustrates a more detailed flow diagram for implementing analog behavioral modeling and IP (intellectual property) integration using SystemVerilog Hardware Description Language in some embodiments.

FIG. 8 illustrates a more detailed flow diagram for implementing analog behavioral modeling and IP (intellectual property) integration using SystemVerilog Hardware Description Language in some embodiments. More particularly, FIG. 8 illustrates an approach to allow users to port existing real-valued models to SystemVerilog by providing a package that defines a set of built-in nettypes that are equivalent to the typed wreal nets in some embodiments. In these embodiments, the method allows users to port the wreal models into SystemVerilog simply by importing a package in the user's model and changing the file extension of the file to ".sv" so that SystemVerilog recognizes the file as a SystemVerilog source file. In one or more embodiments, the method may comprise the process 802 of creating or identifying a SystemVerilog package that covers the definition of wreal signals from Verilog-AMS. In some embodiments, a SystemVerilog package includes declarations such as data, type(s), class(es), task(s), and/or function(s), etc. and provides support to help share common code, parameter(s), data, type(s), task(s), function(s), sequence(s), and/or property(ies), etc. across multiple modules. In some embodiments, the method may comprise the process 804 of porting at least some existing wreal model to SystemVerilog and the process 806 of determining whether there exists a port size mismatch.

In some embodiments, the method may comprise the process 808 of determining whether there exists an unsupported wreal concatenation. For example, the method may determine whether there exists in inherited connection on wreal nets of the built-in nettype in some embodiments where inherited connection on nets of built-in nettype(s) is ignored or discarded. In some embodiments, the method may comprise the process 810 of determining one or more additional porting requirements. For example, the method may determine one or more additional porting requirements to accommodate the embodiments where it is determined that a port size mismatch exists. In some embodiments, the method may optionally comprise the process 812 of determining an option for porting an existing wreal model to SystemVerilog. For example, the method may determine to include an "-rnm_package" (or -RNM_PACKAGE) option in the integrated simulation or verification environment to make access to the real number modeling packages (RNM packages) easier.

In one embodiment, this -rnm_package option may be added or appended to a command such as a single-step or a multi-step command for invoking Verilog simulations in a Verilog simulator to build the package and to make the package available for import into SystemVerilog modules that the integrated simulation or verification environment is compiling. In one or more embodiments, the method may comprise the process 814 of determining whether one or more exceptions apply. In some embodiments, an exception may require that a Verilog-AMS module that includes electrical nets cannot be ported to SystemVerilog. In other embodiments, an exception may require that a module including Verilog-AMS specific language may require an additional porting process in order to be compatible with SystemVerilog and thus become available for porting into SystemVerilog. In these embodiments, the additional porting process may include a process of determining whether the module includes one or more Verilog-AMS specific elements (e.g., domain, disciplines, etc.).

In addition or in the alternative, the additional porting process may include a process of determining one or more additional porting requirements for the module, wherein the one or more additional porting requirements include one or more SystemVerilog elements that are semantically and/or syntactically equivalent to the one or more Verilog-AMS specific elements in the module. In one or more embodiments, the method may comprise the process 816 of porting at least some existing wreal models into SystemVerilog based at least in part upon the one or more additional porting requirements.

The following code illustrates an example of a package named CDS_RNM_SV_WREAL.
    package CDS_RNM_SV_WREAL;
      // Equivalent to VAMS wreal1drv
      nettype real wreal1driver with CDS_res_wreal1driver;
      // Equivalent to VAMS wreal4state
      nettype real wreal4state with CDS_res_wreal4state;
      // Equivalent to VAMS wrealmin
      nettype real wrealmin with CDS_res_wrealmin;
      // Equivalent to VAMS wrealmax
      nettype real wrealmax with CDS_res_wrealmax;
      // Equivalent to VAMS wrealsum
      nettype real wrealsum with CDS_res_wrealsum;
      // Equivalent to VAMS wrealavg
      nettype real wrealavg with CDS_res_wrealavg;
    endpackage: CDS_RNM_SV_WREAL The following code illustrates an exemplary Verilog-AMS module:
    module real_model(x);
      input x [0:3];
      wrealavg x [0:3];
      child C(x);
    endmodule By using the process illustrated in FIG. 8, the exemplary Verilog-AMS module may be ported to use SystemVerilog nettypes by importing the package as shown in the exemplary code below:
    import CDS_RNM_SV_WREAL::*;
      module real_model(x);
      input x [0:3];
      wrealavg x [0:3];
      child C(x);
    endmodule In some embodiments, the computer system executing various modules described herein may execute the method to provide support for extended compatibility semantics for SystemVerilog nettypes and support for table model with SystemVerilog real signals. Some of these embodiments allow the characterization of a complex analog or mixed-signal system in the form of a table such that, when provided with an input and some control information, these embodiments may generate an output value based at least in part on interpolation(s) between entries in a table model that has been previously established. That is, the table model allows the determination of a previously characterized version of an analog or a mixed-signal model or design in the form of a table model such that the analog or mixed-signal model or design may be accurately represented and simulated in SystemVerilog without requiring a user to rewrite the functional details of the analog or mixed-signal model or design.

For example, Verilog-AMS language or VHDL real data types or other languages with real data type provide similar functionality for analog behavioral modeling. These embodiments extend such functionality for digital real modeling in such a way to leverage the extensive functionalities of SystemVerilog. For example, some embodiments extend the @table_model function in Verilog-AMS with supporting semantics and/or syntax and technologies to SystemVerilog such that users may perform identical or substantial similar interpolation process and extrapolation process in System-Verilog when simulating an electronic design by sweeping one or more parameters across some ranges. With these embodiments, SystemVerilog now provides the native capability of generating samples during simulations via parametric sweeping that involves recursive interpolation and extrapolation in a substantially similar manner as what the $table_model function provided in Verilog-AMS.

In some embodiments, the extended table model or extended table model function residing natively in System-Verilog defines a format to represent design data for simulation and a set of one or more interpolation or extrapolation schemes. In some embodiments, an interpolation scheme or an extrapolation scheme is defined or included in the extended table model or the extended table model function on a per dimension basis such that the interpolation or the extrapolation scheme operates in a single dimension on a one-dimensional data of a multi-dimensional design data. In some embodiments, the interpolation scheme may comprise a look up scheme, a linear scheme, a polynomial scheme, a Gaussian process-based interpolation, a spline interpolation, or any other suitable interpolation schemes. In some embodiments, an extrapolation scheme may comprise a constant, a linear, an error scheme, or any other suitable extrapolation schemes. In the embodiments where the interpolation scheme comprises a lookup process, the lookup variables may include any legal expressions that may be assigned to a real-valued signal or net.

The aforementioned embodiments allow the extended table model or extended table model function to be used in SystemVerilog digital behavior block and allows for simple portion of behavioral analog or mixed-signal blocks that are using, for example but not limited Verilog-AMS $table_model function to SystemVerilog real modeling. An exemplary implementation is provided below:

```
nettype real wrealsum with CDS_res_wrealsum;
module example(output wrealsum rout, input wrealsum
   rin1, input wrealsum rin2, input wire clk);
   real out;
   assign rout=out;
   always @clk
      out=$table_model(rin1, rin2,"sample.dat");
endmodule
```

The aforementioned embodiments enable the use of the native SystemVerilog table model or table model function in an analog or mixed-signal context as well as in the digital context (e.g., in an "initial" or an "always" block). In addition, these embodiments use the table model function in simulations (e.g., functional simulation or timing simulation) to replace transistor circuitry with a table model that operates on real number sweep data for measurement. As an illustrative example, consider the following Verilog-AMS module that measures input and output voltage values and saves the data into an ASCII text file as a two-dimensional table that may be reused in a Verilog-AMS $table_model function:

```
'include "disciplines.vams"
'timescale 1 ns/100 ps
module probe2table (a, b, clk);
input a, b, clk;
electrical a, b;
parameter lsb=1u; real previous_b_value=0; integer fptr;
   integer index=1;
initial begin fptr=$fopen("table2d.dat", "w");
   if(!fptr) $stop;
   $display(">>Open the file for writing");
   previous_b_value=V(b);
end
always @(posedge(clk)) begin
   if (V(b)−previous_b_value>lsb)
   begin $fwrite(fptr, "% d %1.9f %1.9f\n", index, V(a),
      V(b));
      $display(">>Write the data t=%-6d ns V(a)=%1.9f
         V(b)=%1.9f",$time,V(a),V(b));
      previous_b_value=V(b);
      index=index+1;
   end
end
endmodule
```

In this exemplary implementation, various embodiments may reuse the resulting "table2d.dat" file in a table model function that has a wreal as an independent variable as follows:

```
'define TABLE_FILE_NAME "table2d.dat"
'timescale 1 ns/100 ps
module inv_table (a, y);
output y; wreal y;
parameter real td=10p;
input a; wreal a;
real y_reg;
real delay_ns=td/1.0e9;
initial begin
   y_reg=$table_model(a, 'TABLE_FILE_NAME,"I,
      1L");
end
always @(a) begin
   #delay_ns  y_reg=$table_model(a, 'TABLE_FILE_
      NAME,"I,1L");
end
assign y=y_reg;
endmodule
```

In the "initial" and "block" blocks in the above exemplary code, the interpolated data is assigned to a real-valued variable, y_reg. The value of the td(real) parameter that presents the propagation delay of an inverter gate may be used to determine when to assign the value of y_reg to the wreal output value, y. Therefore, these embodiments interpolate and extrapolate to estimate each value from the known set of values by using at least the specified control string. Moreover, the first part of the specified control string ("I" in the above example) may be used to control the numerical aspects of the interpolation process in this example to cause the method to ignore the corresponding dimension (column) in the data file. In addition, the number "I" denotes the degree of the interpolation splines in this example. The last part of the control string ("L" representing "Linear extrapolation" in the above example) specifies the extrapolation scheme to evaluate a point that is outside the region of sample points included in the data file.

System Architecture Overview

Figure 9:
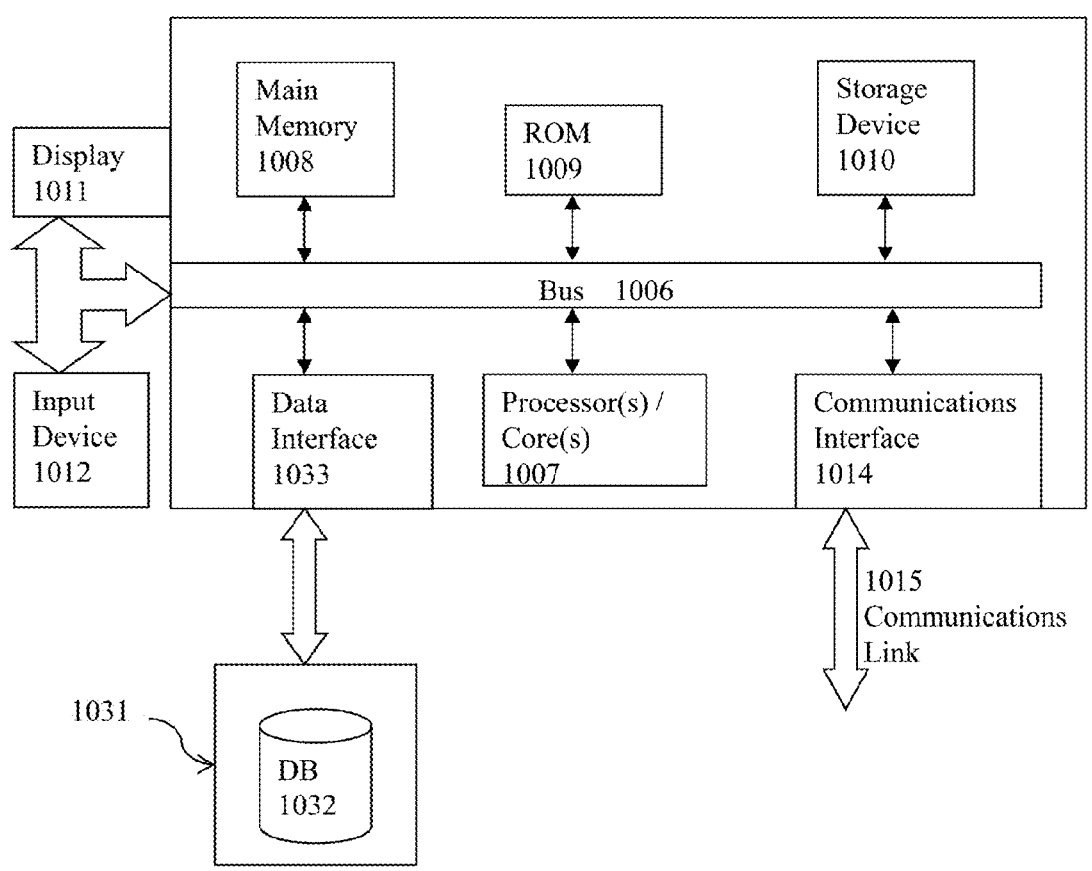
FIG. 9 illustrates a computerized system on which a method for implementing analog behavioral modeling and IP (intellectual property) integration using SystemVerilog Hardware Description Language may be implemented.

FIG. 9 illustrates a block diagram of an illustrative computing system 1000 suitable for implementing analog behavioral modeling and IP (intellectual property) integration using SystemVerilog Hardware Description Language (HDL) as described in the preceding paragraphs with reference to various figures. Computer system 1000 includes a bus 1006 or other communication mechanism for communicating information, which interconnects subsystems and devices, such as processor 1007, system memory 1008 (e.g., RAM), static storage device 1009 (e.g., ROM), disk drive 1010 (e.g., magnetic or optical), communication interface 1014 (e.g., modem or Ethernet card), display 1011 (e.g., CRT or LCD), input device 1012 (e.g., keyboard), and cursor control (not shown).

According to one embodiment, computer system 1000 performs specific operations by one or more processor or processor cores 1007 executing one or more sequences of one or more instructions contained in system memory 1008. Such instructions may be read into system memory 1008 from another computer readable/usable storage medium, such as static storage device 1009 or disk drive 1010. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

Various actions or processes as described in the preceding paragraphs may be performed by using one or more processors, one or more processor cores, or combination thereof 1007, where the one or more processors, one or more processor cores, or combination thereof executes one or more threads. For example, the act of specifying various net or terminal sets or the act or module of performing verification or simulation, etc. may be performed by one or more processors, one or more processor cores, or combination thereof. In one embodiment, the parasitic extraction, current solving, current density computation and current or current density verification is done in memory as layout objects or nets are created or modified.

The term "computer readable storage medium" or "computer usable storage medium" as used herein refers to any medium that participates in providing instructions to processor 1007 for execution. Such a medium may take many forms, including but not limited to, non-volatile media and volatile media. Non-volatile media includes, for example, optical or magnetic disks, such as disk drive 1010. Volatile media includes dynamic memory, such as system memory 1008.

Common forms of computer readable storage media includes, for example, electromechanical disk drives (such as a floppy disk, a flexible disk, or a hard disk), a flash-based, RAM-based (such as SRAM, DRAM, SDRAM, DDR, MRAM, etc.), or any other solid-state drives (SSD), magnetic tape, any other magnetic or magneto-optical medium, CD-ROM, any other optical medium, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1000. According to other embodiments of the invention, two or more computer systems 1000 coupled by communication link 1015 (e.g., LAN, PTSN, or wireless network) may perform the sequence of instructions required to practice the invention in coordination with one another.

Computer system 1000 may transmit and receive messages, data, and instructions, including program, i.e., application code, through communication link 1015 and communication interface 1014. Received program code may be executed by processor 1007 as it is received, and/or stored in disk drive 1010, or other non-volatile storage for later execution. In an embodiment, the computer system 1000 operates in conjunction with a data storage system 1031, e.g., a data storage system 1031 that contains a database 1032 that is readily accessible by the computer system 1000. The computer system 1000 communicates with the data storage system 1031 through a data interface 1033. A data interface 1033, which is coupled to the bus 1006, transmits and receives electrical, electromagnetic or optical signals that include data streams representing various types of signal information, e.g., instructions, messages and data. In embodiments of the invention, the functions of the data interface 1033 may be performed by the communication interface 1014.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

We claim:

1. A computer implemented method for implementing analog behavioral modeling and IP (intellectual property) integration using a Hardware Description Language, comprising:

determining or identifying, with a nettype and resolution function management module at least partially stored in memory and configured to include or function in conjunction with at least one processor or at least one processor core, a set of built-in nettypes including at least one wire-real nettype in a SystemVerilog modeling environment;

defining a discipline with a domain type of a domain as a native capability of the SystemVerilog modeling environment at least by binding one or more attributes of the domain;

characterizing at least one real-valued net of one or more real-valued nets with the discipline associated with the at least one real-valued net and one or more characteristics of the discipline;

determining or identifying a plurality of resolution functions for the set of built-in nettypes natively in the SystemVerilog modeling-environment, the plurality of resolution functions including at least one built-in resolution function and at least one modified resolution function modified from a built-in resolution function;

porting an analog or a mixed-signal portion including at least the at least one real-valued net of the one or more real-valued nets and information about the domain and the discipline into an electronic design in the SystemVerilog modeling environment by using at least native real modeling capabilities of the SystemVerilog modeling environment without recreating details of the analog or mixed-signal portion; and reducing computational resource utilization at least by elaborating the electronic design into an elaborated electronic design and by performing multiple verification or simulation tasks, at a simulation or verification module residing on one computing node and receiving the electronic design from a separate computing node, for the elaborated electronic design with the set of native real modeling capabilities of the SystemVerilog modeling environment.

2. The computer implemented method of claim 1, the process further comprising:

determining a mapping between the plurality of resolution functions and the set of built-in nettypes;

resolving multiple real-valued drivers that drive a receiver in the SystemVerilog modeling-environment based at least in part upon the mapping;

creating or defining a wreal to be a discrete signal having four states natively in the SystemVerilog modeling environment, wherein the wreal is used to model an analog signal in the SystemVerilog modeling environment; and associating a resolution function of the plurality of resolution functions with the wreal.

3. The computer implemented method of claim 2, wherein the act of associating the resolution function is performed via a discipline declaration process, via a default setting, via direct declaration, or based at least in part upon connectivity or usage of the wreal in a design.

4. The computer implemented method of claim 1, the process further comprising:
correlating a real-valued net of a built-in nettype in the SystemVerilog modeling environment with a corresponding resolution function based at least in part upon the mapping.

5. The computer implemented method of claim 1, the process further comprising:
providing native wreal capabilities in the SystemVerilog modeling environment at least by determining one or more real-valued built-in nettypes natively in the SystemVerilog modeling environment based at least in part upon a correlation between one or more real-valued resolution functions and the one or more real-valued built-in nettypes, wherein
the native wreal capabilities are equivalent to wreal capabilities in a Verilog-AMS modeling environment for modeling analog or mixed-signal electronic circuit designs.

6. The computer implemented method of claim 1, the process further comprising:
declaring or defining an unresolved wreal nettype having an element of a real data type in the SystemVerilog modeling environment to provide wreal capabilities natively in the SystemVerilog modeling environment, wherein
the wreal capabilities in the SystemVerilog modeling environment are equivalent to wreal capabilities in a Verilog-AMS modeling environment for modeling analog or mixed-signal electronic circuit designs.

7. The computer implemented method of claim 1, the process further comprising:
migrating or porting a Verilog-AMS model, which is written in Verilog-AMS language, into the SystemVerilog modeling environment based at least in part upon the set of built-in nettypes;
identifying a Verilog-AMS wreal net in the Verilog-AMS model; and
coercing the Verilog-AMS wreal net to the at least one wire-real nettype in the SystemVerilog modeling environment.

8. The computer implemented method of claim 7, the process further comprising:
determining whether a port size mismatch exists;
determining whether an unsupported wreal concatenation exists; and
determining one or more additional requirements based at least in part upon existence of the port size mismatch or of the unsupported wreal concatenation.

9. The computer implemented method of claim 7, the process further comprising:
determining an option for migrating or porting the Verilog-AMS model; and
determining whether one or more exceptions apply to migrating or porting the Verilog-AMS model.

10. The computer implemented method of claim 1, wherein an act of resolving the multiple real-valued drivers comprises:
identifying at least one of the plurality of resolution functions based at least upon the multiple real-valued drivers;
identifying or declaring one or more disciplines for the multiple real-valued drivers; and
correlating the at least one of the plurality of resolution functions with the one or more disciplines, wherein associating the resolution function is performed via a discipline declaration process, via a default setting, via direct declaration, or based at least in part upon connectivity or usage of a wreal in a design.

11. The computer implemented method of claim 1, wherein the set of built-in nettypes including the at least one wire-real nettype provides the SystemVerilog modeling environment with at least one native wire-real capability for directly modeling behavior of one or more real-valued nets with the at least one wire-real nettype in the SystemVerilog modeling environment.

12. A system for implementing analog behavioral modeling and IP (intellectual property) integration using a Hardware Description Language, comprising:
at least one processor or at least one processor core that is at least to:
invoke a nettype and resolution function management module that is at least partially stored in memory and includes or functions in conjunction with at least one processor or at least one processor core to determine a set of built-in nettypes including at least one wire-real nettype in a SystemVerilog modeling environment;
define a discipline with a domain type of a domain as a native capability of the SystemVerilog modeling environment at least by binding one or more attributes of the domain;
characterize at least one real-valued net of the one or more real-valued nets with the discipline associated with the at least one real-valued net and one or more characteristics of the discipline;
determine or identify plurality of resolution functions for the set of built-in nettypes natively in the SystemVerilog modeling environment, the plurality of resolution functions including at least one built-in resolution function and at least one modified resolution function modified from a built-in resolution function;
port an analog or a mixed-signal portion including at least the at least one real-valued net of the one or more real-valued nets and information about the domain and the discipline into an electronic design by using at least native real modeling capabilities of the SystemVerilog modeling environment without recreating details of the analog or mixed-signal portion; and
reducing computational resource utilization at least by elaborating the electronic design into an elaborated electronic design and by performing multiple verification or simulation tasks, at a simulation or verification module residing on one computing node and receiving the electronic design from a separate computing node, for the elaborated electronic design with the set of native real modeling capabilities of the SystemVerilog modeling environment.

13. The system of claim 12, in which the at least one processor or at least one processor core is further to:
determine a mapping between the plurality of resolution functions and the set of built-in nettypes;
resolve multiple real-valued drivers that drive a receiver in the digital SystemVerilog modeling environment based at least in part upon the mapping;
create or define a wreal to be a discrete signal having four states natively in the SystemVerilog modeling environment, wherein the wreal is used to model an analog signal in the SystemVerilog modeling environment; and
associate a resolution function of the plurality of resolution functions with the wreal.

14. The system of claim 12, in which the at least one processor or at least one processor core is further to:
   correlate a real-valued net of a built-in nettype in the SystemVerilog modeling environment with a corresponding resolution function based at least in part upon the mapping.

15. The system of claim 12, in which the at least one processor or at least one processor core is further to:
   provide native wreal capabilities in the SystemVerilog modeling environment at least by determining one or more real-valued built-in nettypes natively in the SystemVerilog modeling environment based at least in part upon a correlation between one or more real-valued resolution functions and the one or more real-valued built-in nettypes, wherein the native wreal capabilities are equivalent to wreal capabilities in a Verilog-AMS modeling environment for modeling analog or mixed-signal electronic circuit designs; or
   declare or define an unresolved real-valued nettype having an element of a real data type in the SystemVerilog modeling environment to provide wreal capabilities natively in the SystemVerilog modeling environment, wherein the wreal capabilities in the SystemVerilog modeling environment are equivalent to the wreal capabilities in a Verilog-AMS modeling environment for modeling analog or mixed-signal electronic circuit designs.

16. The system of claim 12, in which the at least one processor or at least one processor core is further to:
   migrate or port a Verilog-AMS model, which is written in Verilog-AMS language, into the SystemVerilog modeling environment based at least in part upon the set of built-in nettypes.

17. The system of claim 12, in which the at least one processor or at least one processor core is further to:
   determine whether non-SystemVerilog compliant usage exists;
   determine whether an unsupported wreal concatenation exists; and
   determine one or more additional requirements based at least in part upon existence of a port size mismatch or of the unsupported wreal concatenation.

18. The system of claim 17, in which the at least one processor or at least one processor core is further to:
   determine an option for migrating or porting the Verilog-AMS model; and
   determine whether one or more exceptions apply to migrating or porting the Verilog-AMS model.

19. The system of claim 12, in which the at least one processor or at least one processor core that is to resolve the multiple real-valued drivers is further to:
   identify at least one of the plurality of resolution functions based at least upon the multiple real-valued drivers;
   identify or declaring one or more disciplines for the multiple real-valued drivers; and
   correlate the at least one of the plurality of resolution functions with the one or more disciplines, wherein the at least one processor or at least one processor core associates the resolution function is performed via a discipline declaration process, via a default setting, via direct declaration, or based at least in part upon connectivity or usage of wreal signals in a design.

20. The system of claim 12, wherein the set of built-in nettypes including the at least one wire-real nettype provides the SystemVerilog modeling environment with at least one native wire-real capability for directly modeling behavior of one or more real-valued nets with the at least one wire-real nettype in the SystemVerilog modeling environment.

21. An article of manufacture comprising a non-transitory computer accessible storage medium having stored thereupon a sequence of instructions which, when executed by at least one processor or at least one processor core executing one or more threads, causes the at least one processor or the at least one processor core to perform a set of acts for implementing analog behavioral modeling and IP (intellectual property) integration using a Hardware Description Language, the set of acts comprising:
   determining or identifying, with a nettype and resolution function management module at least partially stored in memory and including or functioning in conjunction with at least one processor or at least one processor core, a set of built-in nettypes including at least one wire-real nettype in a SystemVerilog modeling environment;
   defining a discipline with a domain type of a domain into a set of native real modeling capabilities of the SystemVerilog modeling environment at least by binding one or more attributes of the domain;
   characterizing at least one real-valued net of one or more real-valued nets with the discipline associated with the at least one real-valued net and one or more characteristics of the discipline;
   determining or identifying plurality of resolution functions for the set of built-in nettypes into the set of native real modeling capabilities of the SystemVerilog modeling environment, the plurality of resolution functions including at least one built-in resolution function and at least one modified resolution function modified from a built-in resolution function;
   porting an analog or a mixed-signal portion including at least the at least one real-valued net of the one or more real-valued nets in an electronic design by using at least the set of native real modeling capabilities of the SystemVerilog modeling environment without recreating details of the analog or mixed-signal portion; and
   reducing computational resource utilization at least by elaborating the electronic design into an elaborated electronic design and by performing multiple verification or simulation tasks, at a simulation or verification module residing on one computing node and receiving the electronic design from a separate computing node, for the elaborated electronic design with the set of native real modeling capabilities of the SystemVerilog modeling environment.

22. The article of manufacture of claim 21, the process further comprising:
   determining a mapping between the plurality of resolution functions and the set of built-in nettypes;
   resolving multiple real-valued drivers that drive a receiver in the SystemVerilog modeling-environment based at least in part upon the mapping;
   creating or defining a wreal to be a discrete signal having four states natively in the SystemVerilog modeling environment, wherein the wreal is used to model an analog signal in the SystemVerilog modeling environment; and
   associating a resolution function of the plurality of resolution functions with the wreal.

23. The article of manufacture of claim 21, the process further comprising:
correlating a real-valued net of a built-in nettype in the SystemVerilog modeling environment with a corresponding resolution function based at least in part upon the mapping.

24. The article of manufacture of claim 21, the process further comprising:
providing native wreal capabilities in the SystemVerilog modeling environment at least by determining one or more wreal built-in nettypes natively in the SystemVerilog modeling environment based at least in part upon a correlation between one or more real-valued resolution functions and the one or more real-valued built-in nettypes, wherein the native wreal capabilities are equivalent to wreal capabilities in a Verilog-AMS modeling environment for modeling analog or mixed-signal electronic circuit designs; or
declaring or defining an unresolved real-valued nettype having an element of a real data type in the SystemVerilog modeling environment to provide wreal capabilities natively in the SystemVerilog modeling environment, wherein the wreal capabilities in the SystemVerilog modeling environment are equivalent to wreal capabilities in a Verilog-AMS modeling environment for modeling analog or mixed-signal electronic circuit designs.

25. The article of manufacture of claim 24, the process further comprising:
determining whether a port size mismatch exists;
determining whether an unsupported wreal concatenation exists; and
determining one or more additional requirements based at least in part upon existence of the port size mismatch or of the unsupported wreal concatenation.

26. The article of manufacture of claim 25, the process further comprising:
determining an option for migrating or porting the Verilog-AMS model; and
determining whether one or more exceptions apply to migrating or porting the Verilog-AMS model.

27. The article of manufacture of claim 21, the process further comprising:
migrating or porting a Verilog-AMS model, which is written in Verilog-AMS language, into the SystemVerilog modeling environment based at least in part upon the set of built-in nettypes; and
associating the at least one real-valued net of the one or more real-valued nets with the discipline by a discipline resolution process performed in the SystemVerilog modeling environment based in part or in whole upon connectivity or usage of the at least one real-valued net.

28. The article of manufacture of claim 21, the process further comprising:
defining a plurality of disciplines and domains;
incorporating the plurality of disciplines and domains into the SystemVerilog modeling environment as a part of the native real modeling capabilities; and
associating the at least one real-valued net of the one or more real-valued nets with the discipline by a default setting of the SystemVerilog modeling environment.

29. The article of manufacture of claim 21, wherein the act of resolving the multiple real-valued drivers comprises:
identifying at least one of the plurality of resolution functions based at least upon the multiple real-valued drivers;
identifying or declaring one or more disciplines for the multiple real-valued drivers; and
correlating the at least one of the plurality of resolution functions with the one or more disciplines, wherein associating the resolution function is performed via a discipline declaration process, via a default setting, via direct declaration, or based at least in part upon connectivity or usage of wreal signals in a design.

* * * * *